US009508227B1

(12) United States Patent
Nottke

(10) Patent No.: US 9,508,227 B1
(45) **Date of Patent: *Nov. 29, 2016**

(54) MULTI-DRAW VIDEO POKER

(71) Applicant: Timothy G. Nottke, Toledo, OH (US)

(72) Inventor: Timothy G. Nottke, Toledo, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/744,135

(22) Filed: Jun. 19, 2015

Related U.S. Application Data

(63) Continuation-in-part of application No. 13/118,391, filed on May 28, 2011, now Pat. No. 9,067,144.

(60) Provisional application No. 61/350,299, filed on Jun. 1, 2010.

(51) Int. Cl.
*G06F 19/00* (2011.01)
*G07F 17/32* (2006.01)

(52) U.S. Cl.
CPC ....... *G07F 17/3267* (2013.01); *G07F 17/3211* (2013.01); *G07F 17/3258* (2013.01); *G07F 17/3293* (2013.01)

(58) Field of Classification Search
None
See application file for complete search history.

(56) References Cited

U.S. PATENT DOCUMENTS 6,146,271 A * 11/2000 Kadlic ..................... A63F 1/00 273/292
8,449,362 B2 * 5/2013 Jackson .................. G07F 17/32 463/13
2004/0017043 A1 * 1/2004 Moody ............... A63F 3/00157 273/292
2006/0052157 A1 * 3/2006 Walker ................ G07F 17/3227 463/25
2006/0258423 A1 * 11/2006 Englman ................. G07F 17/32 463/11
2007/0026920 A1 * 2/2007 Flint ....................... G07F 17/32 463/13
2008/0108411 A1 * 5/2008 Jensen .................... G07F 17/32 463/20
2008/0182650 A1 * 7/2008 Randall ................... G07F 17/32 463/25
2008/0214255 A1 * 9/2008 Jarvis .................. G07F 17/3293 463/11
2009/0111556 A1 * 4/2009 Moody ................... G07F 17/32 463/20
2009/0270153 A1 * 10/2009 Moody ............... A63F 3/00157 463/13
2010/0081498 A1 * 4/2010 Moody ................... G07F 17/32 463/25

* cited by examiner

*Primary Examiner* — Paul A D'Agostino
(74) *Attorney, Agent, or Firm* — Donald K. Wedding

(57) ABSTRACT

A method of generating and displaying a game of chance on an electronic device to one or more players, wherein each player places a wager on a primary hand of cards dealt from a deck of cards containing at least one Multi-Draw Bonus Card. The player may place an additional wager on one or more Multi-Draw Bonus cards (bonus card) provided on the deal and/or the draw. The bonus card provides for a multiplier and/or n additional cards to be dealt in place of the bonus card. The cards for each band are dealt from a deck of cards using a random number generator.

16 Claims, 23 Drawing Sheets

MULTI-DRAW VIDEO POKER

RELATED APPLICATION

This application is a continuation-in-part under 35 U.S.C. 120 from copending U.S. patent application Ser. No. 13/118,391 filed May 28, 2011, to issue as U.S. Pat. No. 9,067,144 on Jun. 30, 2015, which claims priority under 35 U.S.C. 119(e) from Provisional U.S. Patent Application Ser. No. 61/350,299 filed Jun. 1, 2010.

FIELD OF INVENTION

This invention relates to a method for playing video poker wherein a standard five card hand is dealt or populated and on the draw a bonus scheme is provided wherein one or more Multi-Draw Bonus cards are added to the remaining deck to create the possibility for a bonus. The bonus comprises a multiplier and/or several additional cards added as a stack to the current hand. The cards for the five card hand are dealt from a suitable deck of cards such as a standard deck of fifty-two cards or multiple standard decks using a random number generator.

RELATED PRIOR ART

The following references disclose a video poker game wherein multiple hands are dealt per game for a single player: U.S. Pat. No. 6,098,985 (Moody), U.S. Pat. No. 6,474,645 (Tarantino), U.S. Pat. No. 6,511,068 (Sklansky et al.), U.S. Pat. No. 6,561,898 (Moody), U.S. Pat. No. 7,247,092 (Jarvis et al.), U.S. Pat. No. 7,156,397 (Moody et al.), U.S. Pat. No. 6,443,456 (Gajor), U.S. Patent Publication Nos. 2003/0038425 (Tarantino), 2004/0219970 (Tarantino), and 2005/0026668 (Tarantino), all incorporated herein by reference.

U.S. Patent Publication No. 2006/0287058 (Resnick et al.) discloses a gaming system with multiple game types, and is incorporated herein by reference.

The following references disclose an improved poker game: U.S. Pat. No. 7,137,628 (Moody), U.S. Pat. No. 7,222,856 (Moody), U.S. Pat. No. 7,222,857 (Moody), U.S. Pat. No. 7,222,858 (Moody), and U.S. Patent Publication 2006/0281513 (Kirkpatrick), all incorporated herein by reference.

The following references disclose a gaming device with a bonus scheme: U.S. Pat. No. 6,506,118 (Baerlocher et al.), U.S. Pat. No. 6,514,141 (Kaminkow et al.), U.S. Pat. No. 7,022,016 (Wood et al.), and U.S. Pat. No. 7,247,092 (Jarvis et al.), all incorporated herein by reference.

The following prior art references disclose electronic or computerized gaming devices: U.S. Pat. No. 5,042,809 (Richardson), U.S. Pat. No. 6,248,016 (Walker et al.), U.S. Pat. No. 6,332,839 (Walker et al.), U.S. Pat. No. 7,022,016 (Wood et al.), U.S. Pat. No. 7,222,857 (Moody), U.S. Pat. No. 7,247,091 (Moody), and U.S. Design Pat. No. Des. 395,463 (Scott et al.), all incorporated herein by reference.

U.S. Pat. No. 6,201,532 (Tode et al.), incorporated herein by reference, discloses an electronic gaming device with a deck mounted touch screen.

THE INVENTION

In accordance with this invention, there is provided an improvement to a video poker game wherein a primary poker hand is established by dealing a first hand of cards, discarding selected cards and replacing the discarded cards to form a final hand, a payout being determined for the final hand based on a pre-determined pay scale, the replacing of the discarded cards comprising one or more bonus cards that provide for n additional cards to be dealt in the position of the bonus card such that n final hands are formed. A payout if any is determined for the n+1 hands that include the first hand and each of the n final hands.

This invention relates to a video poker game wherein a player is dealt a hand of five cards face up from a suitable deck of cards such as a standard fifty-two card deck after a pre-determined wager is placed. The player chooses which of the five cards dealt are held in the hand and which cards are discarded. An additional pre-determined wager may be required to initiate the bonus. A bonus scheme on the deal and/or the draw is provided wherein n Multi-Draw Bonus cards are added to the deck to create the possibility for the bonus. If the bonus card is dealt on the deal and/or the draw, n additional cards are dealt in a stack to create n more unique hands. If all of the cards dealt are held, a Multi-Draw Bonus card is added to the current hand and n additional cards are dealt in a stack to create n more unique hands. The bonus scheme is comprised of a multiplier and/or n additional cards added to the current hand. The option for multiple Multi-Draw Bonus cards may be paid for by the player placing additional wagers for each Multi-Draw Bonus card.

A winning hand payout for each hand is based on a pre-determined pay scale and the winnings may be displayed on a credit meter.

Any or all of this game may be played with an actual dealer or with a computerized gaming console and video screen such as a CRT or a flat screen display such as plasma, LCD, OLED, or LED. The game may be played on site at a legal game casino, in a non-gambling mode on-line over the internet, or off-line on a home computer using a disc such as a compact disc (CD), a digital video disc (DVD), or a portable flash drive. The game can also be played in a gambling or non-gambling mode at a tavern, bar, home, or the like.

The game can be played with multiple hands and/or with multiple players. The game may also be played on a video game system such as Xbox Live, Playstation, Xbox One, or Wii. Xbox is a trademark of the Microsoft Corporation, Playstation is a trademark of the Sony Corporation, and Wii is a trademark of the Nintendo Corporation. The game may also be played over a telephone including a mobile or smart phone.

The gaming console may include a computer with a random number generator and an integrated touch system to facilitate player input. The touch system may be an infrared (IR) touch system, capacitive touch system, resistive touch system, surface acoustical wave touch system, or an inductive touch system, mounted to the cabinet or to the bezel of the screen. A keyboard, cursor, or other input device may be used.

A typical game may comprise the following steps:

1. A player initiates game play by wagering a pre-determined amount on a first hand. The initiation of the bonus may require another pre-determined amount to be wagered.
2. The hand is played in the same manner as any other five card video poker game, wherein five cards are dealt and zero to five cards are held, with the non-held cards being discarded and replaced by cards randomly dealt from the remaining deck of cards which also includes one or more added Multi-Draw Bonus cards.
3. If a Multi-Draw Bonus card is not dealt on the draw, the additional cards are drawn and placed in the empty place(s) where the discarded cards were originally located to complete the first hand after the draw. The player wins or loses based on the outcome of this first hand.

4. If a Multi-Draw Bonus card is dealt on the draw, the Multi-Draw Bonus card provides for n additional cards to be dealt so as to form n hands, a payout if any being determined for each hand based on a pre-determined pay scale. Cards are randomly selected from the deck and added to the hand as a stack of n cards to replace the Multi-Draw Bonus card. Winnings, if any, are determined by a pre-determined pay scale and may be placed in a credit meter.
5. If a Multi-Draw Bonus card is randomly selected, for example by a random number generator, it may not include a multiplier. The Multi-Draw Bonus card is removed from the five card hand and may be placed in another area of the gaming display field to serve as a reminder for the bonus that was received. A new card from the deck is placed in the five card hand in the position that originally was held by the Multi-Draw Bonus card plus a stack of n cards. Winnings are calculated based on the final five card hand with the Multi-Draw Bonus card replacement and the bonus cards that are dealt in a stack method in the same location where the Multi-Draw Bonus card originally appeared. This stack method is used to create n unique new hands with the cards that are held and drawn. The player will receive payouts from each winning hand according to the pay scale. Credits may be placed in a credit meter upon completion of the last card in the stack where the Multi-Draw Bonus card was originally located.
6. If a Multi-Draw Bonus card is randomly selected by the random number generator, it may also include a multiplier. The Multi-Draw Bonus card is removed from the five card hand and may be placed in another area of the gaming display field to serve as a reminder for the bonus that was received. A new card from the deck is placed in the five card hand in the position that was held by the Multi-Draw Bonus card plus a stack of n cards. Winnings are calculated based on the final five card hand with the Multi-Draw Bonus card replacement and the bonus cards that are dealt in a stack method in the same location where the Multi-Draw Bonus card originally appeared. This stack method is used to create n unique new hands with the cards that are held and drawn. The player will receive the payouts from each winning hand according to the pay scale. Each winning hand is multiplied with a number (multiplier) that was determined by the Multi-Draw Bonus card. The multiplier number ranges from two to n, typically two to twelve. Credits may be placed in a credit meter upon completion of the last card in the stack where the Multi-Draw Bonus card was originally located.

The n cards are used to create n hands in addition to the first hand. In this embodiment, the Multi-Draw Bonus card is replaced by a card to complete the first hand. This results in a payout, if any, for n+1 hands.

In a variation of this embodiment, the replacement card for the Multi-Draw Bonus card is one of the n cards such that the payout is based on n hands, which includes the first hand.

In one embodiment, the n cards are in a stack arrangement as illustrated in FIGS. 1E, 1F, and 1G. In FIG. 1E, there are two cards in the stack, in FIG. 1F there are three cards in the stack, and in FIG. 1G there are four cards in the stack. Depending on the deck, any number of cards is contemplated.

The stack arrangement allows for additional hands to be dealt and allows the player to view all cards and all hands simultaneously.

The stacking of cards also creates more viewing area on the video screen, area that can be used for more functions. In one embodiment of the game, the Multi-Draw Bonus can be randomly triggered within the game by the CPU or random number generator without the use of a special card appearing in the poker hand.

In one embodiment, additional Multi-Draw Bonus cards are randomly dealt on the draw so that two or more are added to the hand. In another embodiment, a Multi-Draw Bonus card is included as part of the stack of n cards. In still another embodiment, one or more Multi-Draw Bonus cards are randomly selected and included in the originally dealt hand.

Table I shows possible probabilities for receiving a Multi-Draw Bonus card, with n Multi-Draw Bonus cards in the remaining deck after the opening hand is dealt.

TABLE I

| No. of Cards Discarded | No. of Cards Held | Approximate Probability of drawing a Multi-Draw Bonus card |
|---|---|---|
| 1 | 4 | 4% |
| 2 | 3 | 8% |
| 3 | 2 | 12% |
| 4 | 1 | 16% |
| 5 | 0 | 20% |

Table II shows possible probabilities for receiving a specific bonus after drawings a Multi-Draw Bonus card.

TABLE II

| Type of Bonus | | Approximate Probability of Receiving |
|---|---|---|
| New Cards | Multiplier | this Type of Bonus |
| 2 | none | 18% |
| 3 | none | 17% |
| 4 | none | 15% |
| 5 | none | 14% |
| 2 | 2 | 13% |
| 3 | 3 | 12% |
| 4 | 4 | 6% |
| 5 | 5 | 5% |

Another typical game may comprise the following steps:

1. A player initiates game play by wagering a pre-determined amount on a first hand. The initiation of the bonus may require another pre-determined amount to be wagered.
2. The hand is played in the same manner as any other five card video poker game, wherein five cards are dealt and zero to five cards are held, with the non-held cards being discarded and replaced by cards randomly dealt from the remaining deck of cards which also includes one or more added Multi-Draw Bonus cards if the additional pre-determined wager was made.
3. If Multi-Draw Bonus card(s) are dealt on the deal, n additional cards are dealt in a stack in the position where the Multi-Draw card(s) was dealt to create n more unique hands. The hand is played in the same manner as any other five card video poker game, wherein five cards are dealt and zero to five cards are held, with the non-held cards being discarded and replaced by cards randomly dealt from the remaining deck of cards which also includes one or more added Multi-Draw Bonus cards.

4. If a Multi-Draw Bonus card is not dealt on the draw, the additional cards are drawn and placed in the empty place(s) where the discarded cards were originally located to complete the first hand after the draw. The player wins or loses based on the outcome of this first hand.
5. If a Multi-Draw Bonus card is dealt on the draw, the Multi-Draw Bonus card provides for n additional cards to be dealt so as to form n hands, a payout if any being determined for each hand based on a pre-determined pay scale. Cards are randomly selected from the deck and added to the hand as a stack of n cards to replace the Multi-Draw Bonus card. Winnings, if any, are determined by a pre-determined pay scale and may be placed in a credit meter.
6. If multiple Multi-Draw Bonus cards are dealt on the draw, the Multi-Draw Bonus cards provides for n×2 additional cards to be dealt so as to form n×2 hands, a payout if any being determined for each hand based on a pre-determined pay scale. Cards are randomly selected from the deck and added to the hand as a stack of n×2 cards to replace the Multi-Draw Bonus cards. Winnings, if any, are determined by a pre-determined pay scale and may be placed in a credit meter.
7. If a Multi-Draw Bonus card is randomly selected, for example by a random number generator, it may not include a multiplier. The Multi-Draw Bonus card is removed from the five card hand and may be placed in another area of the gaming display field to serve as a reminder for the bonus that was received. A new card from the deck is placed in the five card hand in the position that originally was held by the Multi-Draw Bonus card plus a stack of n cards. Winnings are calculated based on the final five card hand with the Multi-Draw Bonus card replacement and the bonus cards that are dealt in a stack method in the same location where the Multi-Draw Bonus card originally appeared. This stack method is used to create n unique new hands with the cards that are held and drawn. The player will receive payouts from each winning hand according to the pay scale. Credits may be placed in a credit meter upon completion of the last card in the stack where the Multi-Draw Bonus card was originally located.
8. If a Multi-Draw Bonus card is randomly selected by the random number generator, it may also include a multiplier. The Multi-Draw Bonus card is removed from the five card hand and may be placed in another area of the gaming display field to serve as a reminder for the bonus that was received. A new card from the deck is placed in the five card hand in the position that was held by the Multi-Draw Bonus card plus a stack of n cards. Winnings are calculated based on the final five card hand with the Multi-Draw Bonus card replacement and the bonus cards that are dealt in a stack method in the same location where the Multi-Draw Bonus card originally appeared. This stack method is used to create n unique new hands with the cards that are held and drawn. The player will receive the payouts from each winning hand according to the pay scale. Each winning hand is multiplied with a number (multiplier) that was determined by the Multi-Draw Bonus card. The multiplier number ranges from two to n, typically two to twelve. Credits may be placed in a credit meter upon completion of the last card in the stack where the Multi-Draw Bonus card was originally located.

Another typical game may comprise the following steps:

1. A player initiates game play by wagering a pre-determined amount on a first hand. The initiation of the bonus may require another pre-determined amount to be wagered.
2. The hand is played in the same manner as any other five card video poker game, wherein five cards are dealt and zero to five cards are held, with the non-held cards being discarded and replaced by cards randomly dealt from the remaining deck of cards which also includes one or more added Multi-Draw Bonus cards if the additional pre-determined wager was made.
3. If Multi-Draw Bonus card(s) are dealt on the deal, n additional cards are dealt in a stack in the position where the Multi-Draw card(s) was dealt to create n more unique hands. The hand is played in the same manner as any other five card video poker game, wherein five cards are dealt and zero to five cards are held, with the non-held cards being discarded and replaced by cards randomly dealt from the remaining deck of cards which also includes one or more added Multi-Draw Bonus cards.
4. If all five cards dealt on the deal are held, the hand is played in the same manner as any other five card video poker game, with the addition of one or more Multi-Draw Bonus cards, creating n more unique hands.
5. If a Multi-Draw Bonus card is not dealt on the draw, the additional cards are drawn and placed in the empty place(s) where the discarded cards were originally located to complete the first hand after the draw. The player wins or loses based on the outcome of this first hand.
6. If a Multi-Draw Bonus card is dealt on the draw, the Multi-Draw Bonus card provides for n additional cards to be dealt so as to form n hands, a payout if any being determined for each hand based on a pre-determined pay scale. Cards are randomly selected from the deck and added to the hand as a stack of n cards to replace the Multi-Draw Bonus card. Winnings, if any, are determined by a pre-determined pay scale and may be placed in a credit meter.
7. If multiple Multi-Draw Bonus cards are dealt on the draw, the Multi-Draw Bonus cards provides for n×2 additional cards to be dealt so as to form n×2 hands, a payout if any being determined for each hand based on a pre-determined pay scale. Cards are randomly selected from the deck and added to the hand as a stack of n×2 cards to replace the Multi-Draw Bonus cards. Winnings, if any, are determined by a pre-determined pay scale and may be placed in a credit meter.
8. If a Multi-Draw Bonus card is randomly selected, for example by a random number generator, it may not include a multiplier. The Multi-Draw Bonus card is removed from the five card hand and may be placed in another area of the gaming display field to serve as a reminder for the bonus that was received. A new card from the deck is placed in the five card hand in the position that originally was held by the Multi-Draw Bonus card plus a stack of n cards. Winnings are calculated based on the final five card hand with the Multi-Draw Bonus card replacement and the bonus cards that are dealt in a stack method in the same location where the Multi-Draw Bonus card originally appeared. This stack method is used to create n unique new hands with the cards that are held and drawn. The player will receive payouts from each winning hand according to the pay scale. Credits may be placed in a credit meter upon completion of the last card in the stack where the Multi-Draw Bonus card was originally located.

9. If a Multi-Draw Bonus card is randomly selected by the random number generator, it may also include a multiplier. The Multi-Draw Bonus card is removed from the five card hand and may be placed in another area of the gaming display field to serve as a reminder for the bonus that was received. A new card from the deck is placed in the five card hand in the position that was held by the Multi-Draw Bonus card plus a stack of n cards. Winnings are calculated based on the final five card hand with the Multi-Draw Bonus card replacement and the bonus cards that are dealt in a stack method in the same location where the Multi-Draw Bonus card originally appeared. This stack method is used to create n unique new hands with the cards that are held and drawn. The player will receive the payouts from each winning hand according to the pay scale. Each winning hand is multiplied with a number (multiplier) that was determined by the Multi-Draw Bonus card. The multiplier number ranges from two to n, typically two to twelve. Credits may be placed in a credit meter upon completion of the last card in the stack where the Multi-Draw Bonus card was originally located.

DETAILED DESCRIPTION OF THE DRAWINGS

Once a pre-determined wager is placed, an additional pre-determined wager may be required to initiate the possibility of a Multi-Draw Bonus card. A hand is dealt or populated from a suitable deck of cards such as a standard deck of fifty-two cards including two or more standard decks, using a random number generator to determine which cards are dealt to the hand.

Figure 1:
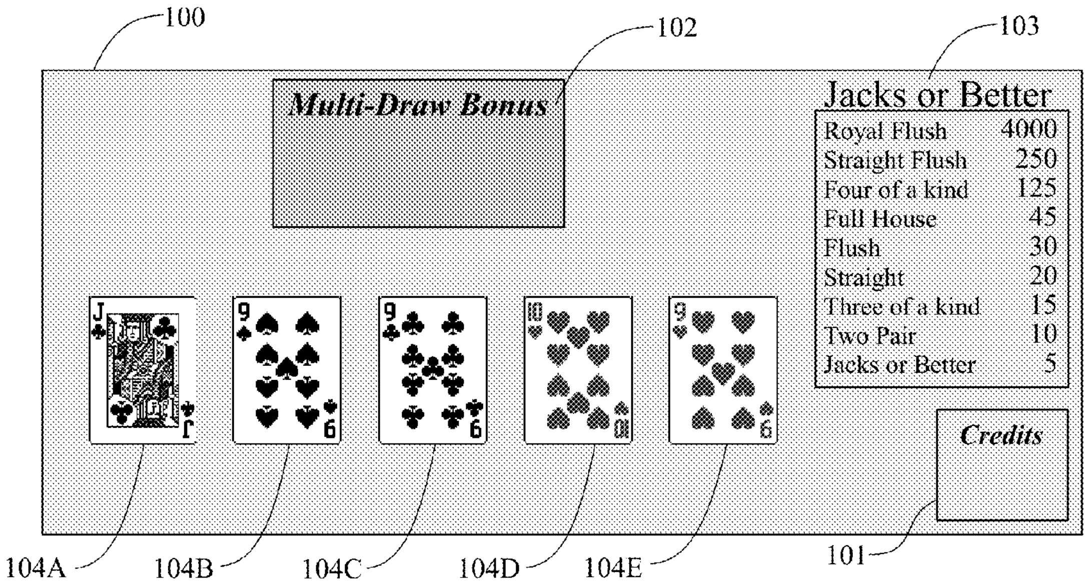
FIG. 1 illustrates an opening deal on the active gaming area.

FIG. 1 illustrates the active gaming area 100 on which the Multi-Draw Bonus indicator 102, the pre-determined pay scale 103, the credit meter 101, and dealt cards 104A, 104B, 104C, 104D, and 104E.

Figure 1A:
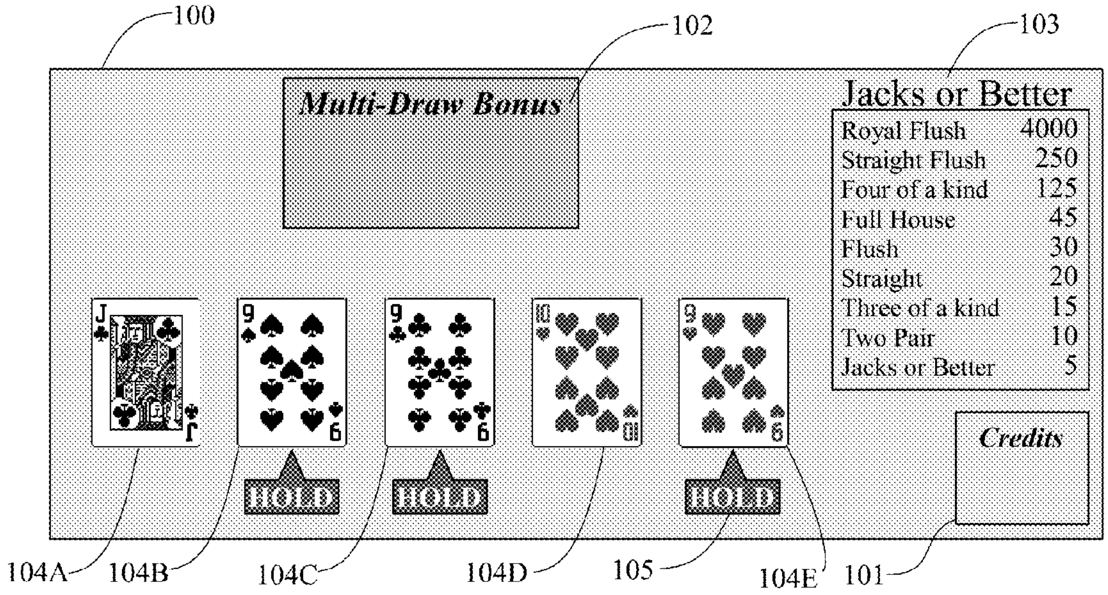
FIG. 1A illustrates which cards are held and which are discarded by the player.

FIG. 1A illustrates the active gaming area 100 on which the Multi-Draw Bonus indicator 102, the pre-determined pay scale 103, the credit meter 101, and the dealt cards 104A, 104B, 104C, 104D, and 104E. Cards 104B, 104C, and 104E are held by the player, and are indicated as held by the hold indicator 105. In the illustration, the player decides to hold the nine of spades 104B, 9 of clubs 104C, and the nine of hearts 104E. The jack of clubs 104A and the 10 of hearts 104D will be discarded.

Figure 1B:
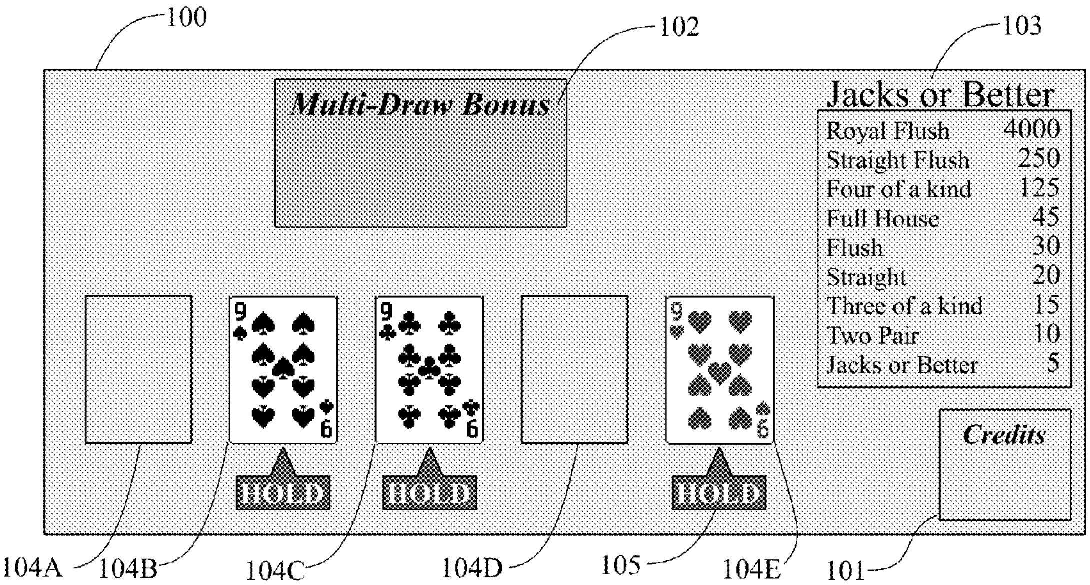
FIG. 1B illustrates the removal of the discarded cards.

FIG. 1B illustrates the active gaming area 100 on which the Multi-Draw Bonus indicator 102, the pre-determined pay scale 103, the credit meter 101, and the remaining cards 104B, 104C, and 104E are shown. Cards 104B, 104C, and 104E held by the player are indicated as held by the hold indicator 105. In this illustration, the jack of clubs 104A and the 10 of hearts 104D have been discarded.

Figure 1C:
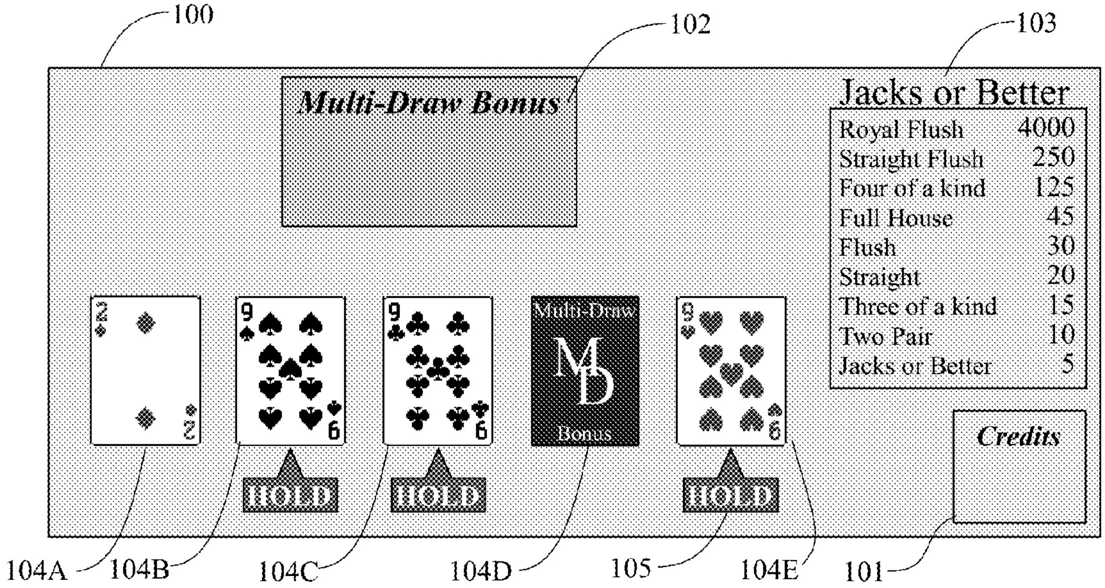
FIG. 1C illustrates the replacement of the discarded cards, one of them being a Multi-Draw Bonus card.

FIG. 1C illustrates the active gaming area 100 on which the Multi-Draw Bonus indicator 102, the pre-determined pay scale 103, the credit meter 101, and the cards 104A, 104B, 104C, 104D, and 104E, are displayed. Cards 104B, 104C, and 104E held by the player are indicated as held by the hold indicator 105. In this illustration, the locations 104A and 104D are randomly filled by the random card generator with the 2 of diamonds 104A and a Multi-Draw Bonus card 104D.

Figure 1D:
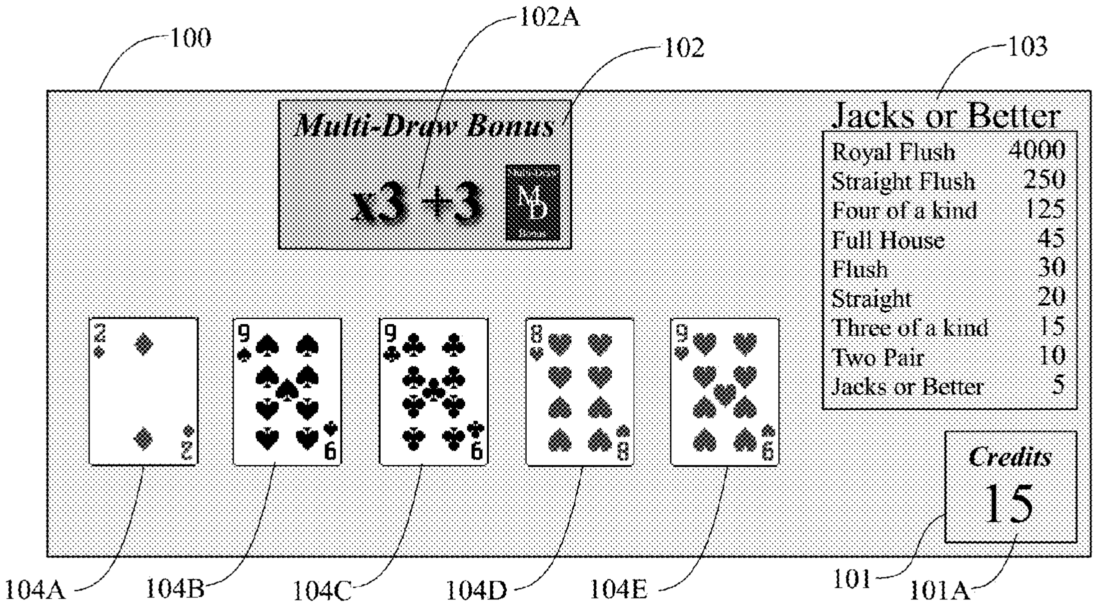
FIG. 1D illustrates the replacement of the Multi-Draw Bonus card with another card from the remaining deck.

FIG. 1D illustrates the active gaming area 100 on which the Multi-Draw Bonus indicator 102, the pre-determined pay scale 103, the credit meter 101, and the cards 104A, 104B, 104C, 104D, and 104E, are displayed. In this illustration, the Multi-Draw Bonus card 104D has been replaced by the 8 of hearts 104D. The Multi-Draw Bonus card triggers the game to randomly select a bonus from a predetermined set of bonuses and is indicated in the bonus indicator box 102. In this situation a x3+3 bonus 102A is selected by the computer and the random number generator. The player will receive three more cards dealt in addition to the 8 of hearts 104D and will receive a multiple of three times the winnings from each new hand. In this illustration, the player has three of a kind for which he/she receives 15 credits. In this illustration, the multiplier of three is not applied to the first hand. However, in another embodiment, it could be.

Figure 1E:
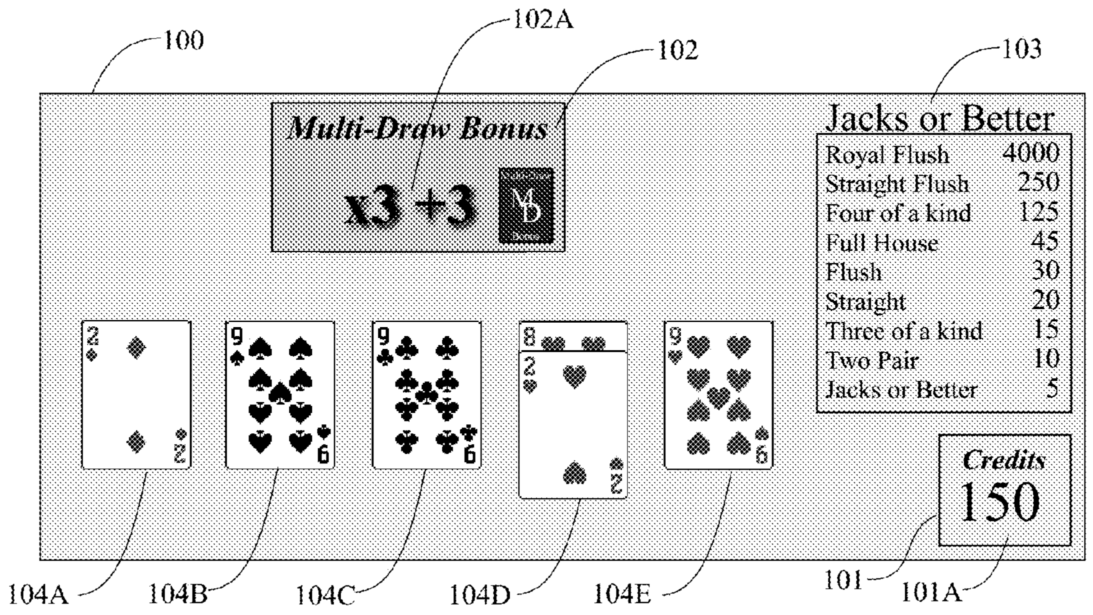
FIG. 1E illustrates the next draw of a card from the remaining deck to replace the Multi-Draw Bonus card from FIG. 1D.

FIG. 1E illustrates the active gaming area 100 on which the Multi-Draw Bonus indicator 102 showing x3+3 bonus 102A, the pre-determined pay scale 103, the credit meter 101 with 150 credits 101A, and the cards 104A, 104B, 104C, 104D, and 104E, are displayed. In this illustration, a Multi-Draw Bonus card 8 of hearts 104D has been replaced by the 2 of hearts 104D. The player will receive 2 more cards as part of a stack dealt in position of the Multi-Draw Bonus card and will receive 3 times the winnings from the resulting new hand. In this illustration, the player has a full house which pays 45 credits x3+15 (from FIG. 1D)=135+15=150 for which he/she receives 150 credits 101A displayed in the credit meter 101.

Figure 1F:
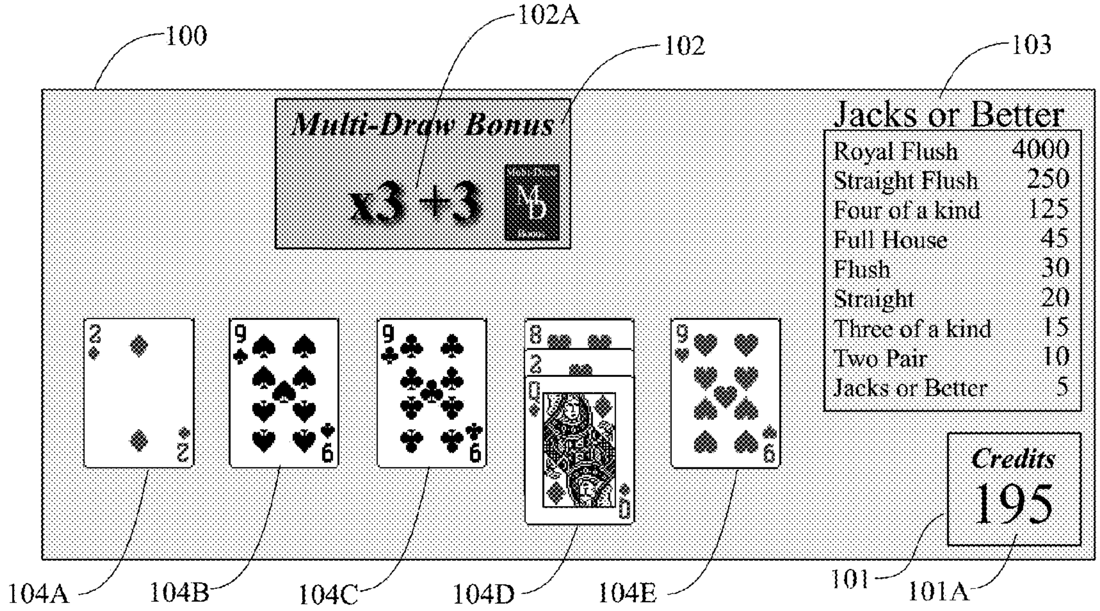
FIG. 1F illustrates the next draw of a card from the remaining deck to replace the Multi-Draw Bonus card from FIG. 1D.

FIG. 1F illustrates the active gaming area 100 on which the Multi-Draw Bonus indicator 102 showing x3+3 bonus 102A, the pre-determined pay scale 103, the credit meter 101 with 195 credits 101A, and the cards 104A, 104B, 104C, 104D, and 104E, are displayed. In this illustration, Multi-Draw Bonus card 2 of hearts 104D has been replaced in the stack by the queen of diamonds 104D. The player will receive three times the winnings from the resulting new hand. In this illustration, the player has three of a kind (three 9's) which pays 15 credits x3+150 (from FIG. 1E)=45+150=195 for which he/she receives 195 credits 101A displayed in the credit meter 101.

Figure 1G:
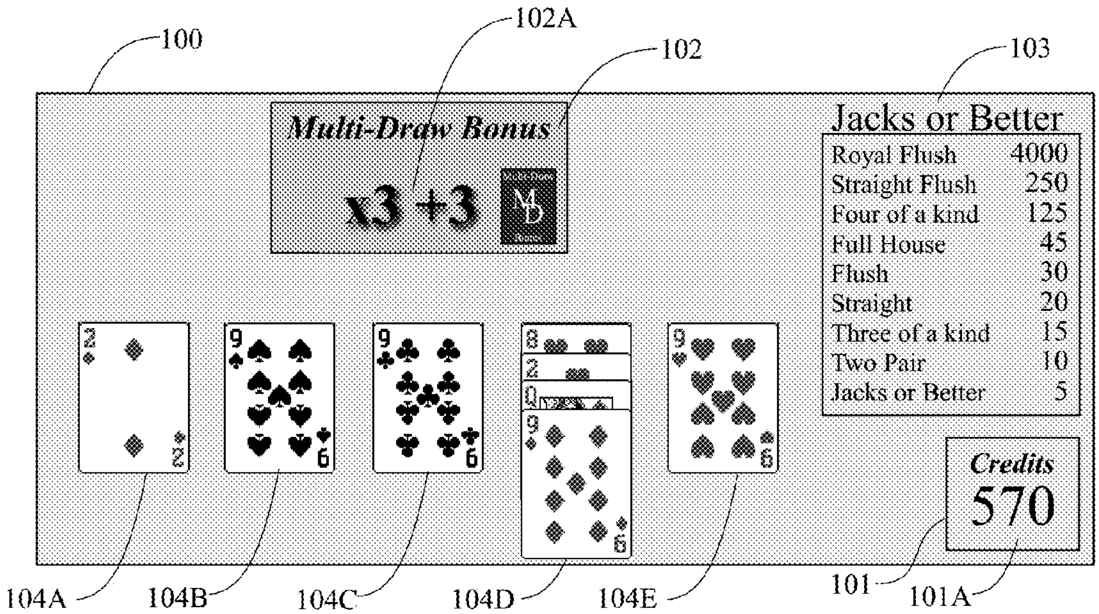
FIG. 1G illustrates the last draw of a card from the remaining deck to replace the Multi-Draw Bonus card from FIG. 1D.

FIG. 1G illustrates the active gaming area 100 on which the Multi-Draw Bonus indicator 102 showing x3+3 bonus 102A, the pre-determined pay scale 103, the credit meter 101 with 570 credits 101A, and the cards 104A, 104B, 104C, 104D, and 104E, are displayed. In this illustration, Multi-Draw Bonus card queen of diamonds 104D has been replaced in the stack by the 9 of diamonds 104D. The player will receive 3 times the winnings from the resulting last hand. In this illustration, the player has four of a kind (four 9's) which pays 125 credits x3+195 (from FIG. 1F)=375+195=570 for which he/she receives 570 credits 101A displayed in the credit meter 101.

Figure 1H:
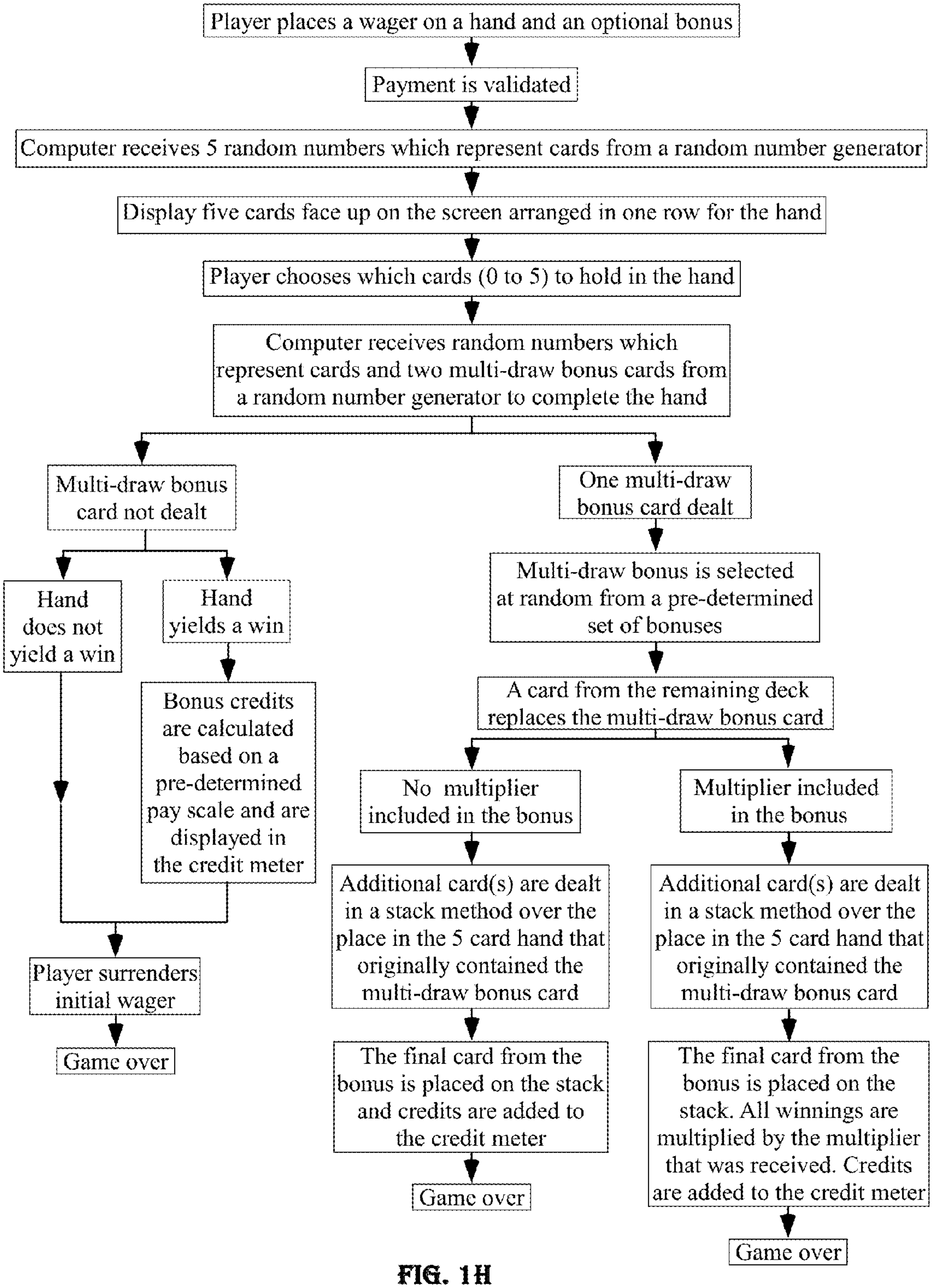
FIG. 1H illustrates a block diagram of one embodiment of typical game play.

FIG. 1H illustrates a block diagram of typical game play. The player places a wager on a hand and an optional bonus hand to initiate game play. The payment is validated by the computer.

The computer receives five random numbers that represent cards from a random number generator, and displays the five cards from a standard deck of fifty-two cards on the screen, arranged in one row of five cards.

The player chooses which cards to hold (zero to five) in the hand and which will be discarded.

The computer receives random numbers that represent cards from the remaining deck plus n Multi-Draw Bonus cards from a random number generator, and displays the replacement cards in place of the discarded cards.

If a Multi-Draw Bonus card is not dealt, and the hand does not yield a win the player surrenders the initial wager and the game is over.

If a Multi-Draw Bonus card is not dealt and the hand yields a win, credits are calculated based on a pre-determined pay scale. The credits may be displayed in the credit meter.

If a Multi-Draw Bonus card is dealt, a Multi-Draw Bonus is selected by the computer at random from a pre-determined set of bonuses. A card from the remaining deck replaces the Multi-Draw Bonus card.

If the bonus selected by the computer does not include an additional multiplier, credits are based on a pre-determined pay scale and are displayed in the credit meter. Additional card(s) are dealt in a stack method over the place in the five card hand that originally contained the Multi-Draw Bonus card. The final card from the bonus is placed on the stack and credits are added to the credit meter.

If the bonus selected by the computer includes an additional multiplier, bonus credits are based on a pre-determined pay scale and multiplied by the bonus multiplier and are displayed in the credit meter. Additional card(s) are dealt in a stack method over the place in the five card hand that originally contained the Multi-Draw Bonus card. The final card from the bonus is placed on the stack. All winnings are multiplied by the multiplier that was received. Credits are added to the credit meter.

Figure 2A:
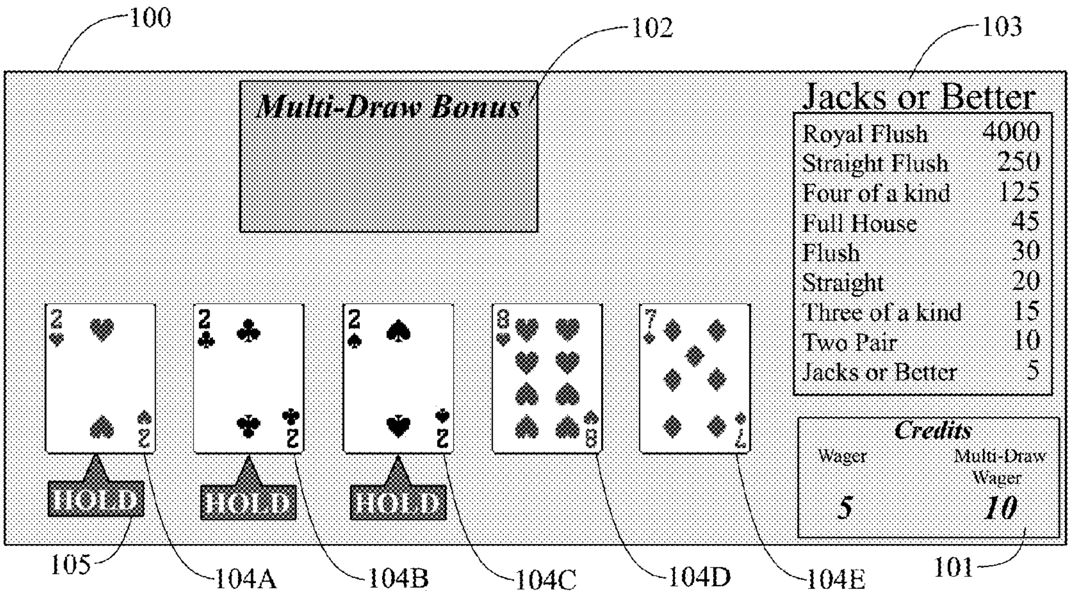
FIG. 2A illustrates another embodiment of game play showing which cards are held and which are discarded by the player.

FIG. 2A illustrates the opening 5 credit wager plus an additional 10 credit wager for the option of a chance of two Multi-Draw Bonus cards to be dealt on the deal of the hand. This embodiment allows the player to pay 5 credits for each Multi-Draw Bonus card to be dealt on the draw. In this embodiment, the Multi-Draw Bonus cards will be drawn into discarded positions 104D and 104E. In other embodiments, the Multi-Draw Bonus card could be dealt into a held position. In yet another embodiment, the player may pay for more than two Multi-Draw Bonus cards to be drawn into the hand. Illustrated wherein are the active gaming area 100 on which the Multi-Draw Bonus indicator 102, the pre-determined pay scale 103, the credit meter 101, and the dealt cards 104A, 104B, 104C, 104D, and 104E. Cards 104A, 104B, and 104C are held by the player, and are indicated as held by the hold indicator 105. In the illustration, the player decides to hold the two of hearts 104A, two of clubs 104B, and the two of spades 104C. The eight of hearts 104D and the seven of diamonds 104E will be discarded.

Figure 2B:
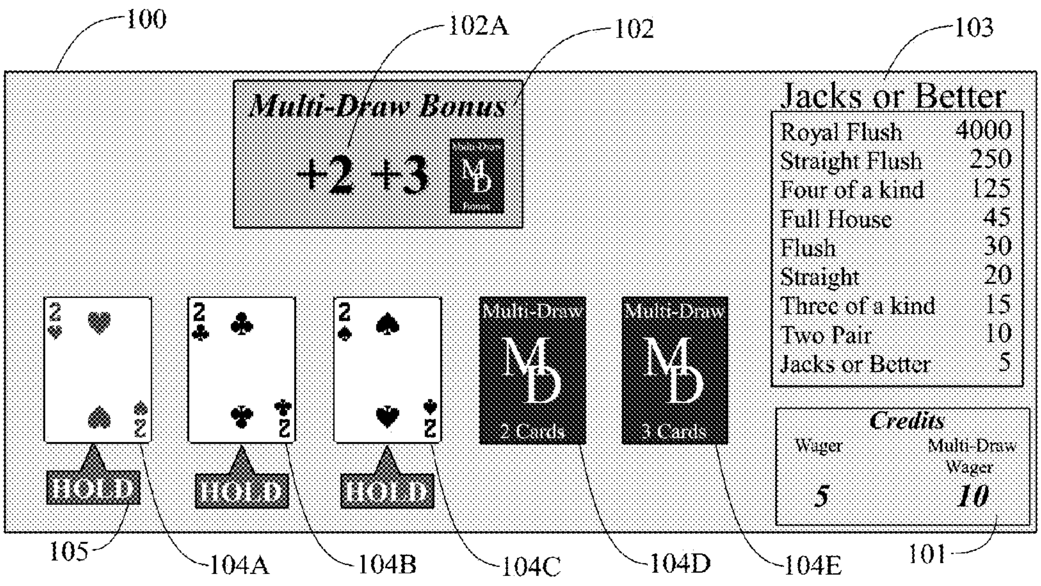
FIG. 2B illustrates two Multi-Draw Bonus cards being enabled by an additional wager and the replacement of the discarded cards, two of them being Multi-Draw Bonus cards.

FIG. 2B illustrates two Multi-Draw Bonus cards being drawn into the hand at positions 104D and 104E. The CPU used the random number generator to determine that the first Multi-Draw Bonus card will award the player with two additional cards at 104D. The CPU used the random number generator again to determine that the second Multi-Draw Bonus card will award the player with three additional cards at 104E. Illustrated wherein are two Multi-Draw Bonus cards 104D and 104E being enabled by an additional wager and the replacement of the discarded cards, two of them being Multi-Draw Bonus cards. Shown are the active gaming area 100 on which the Multi-Draw Bonus indicator 102 displaying the Multi-Draw Bonus 102A of +2 and +3, the pre-determined pay scale 103, the credit meter 101, and the cards 104A, 104B, 104C, 104D, and 104E, are displayed. Cards 104A, 104B, and 104C held by the player are indicated as held by the hold indicator 105. In this illustration, the locations 104D and 104E are randomly filled by the random card generator with two Multi-Draw Bonus cards 104D and 104E.

Figure 2C:
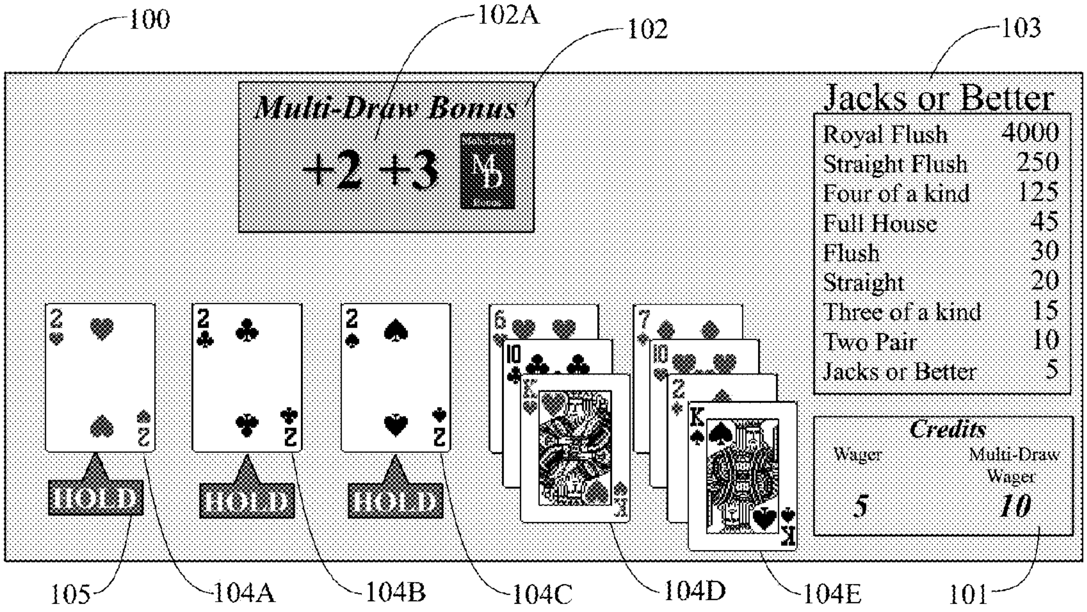
FIG. 2C illustrates the next draw of cards from the remaining deck to replace the Multi-Draw Bonus cards from FIG. 2B.

FIG. 2C illustrates the end result of having been drawn two Multi-Draw Bonus cards into the hand and the additional cards from the deck to complete the hands. Twelve unique hands have been generated for the player to receive winnings based on the pre-determined pay scale 103. Shown are the active gaming area 100 on which the Multi-Draw Bonus indicator 102 showing and additional +2 cards and +3 cards from the Multi-Draw Bonus cards, the pre-determined pay scale 103, the credit meter 101, and the cards 104A, 104B, 104C, 104D, and 104E, are displayed. In this illustration, the Multi-Draw Bonus card 104D has been replaced by the six of hearts, ten of clubs, and king of hearts 104D. The second Multi-Draw Bonus card 104E, has been replaced by the seven of diamonds, ten of hearts, two of diamonds, and king of spades 104E. The Multi-Draw Bonus cards trigger the game to randomly select a bonus from a pre-determined set of bonuses and is indicated in the bonus indicator box 102. In this situation a +2+3 bonus 102A is selected by the computer and the random number generator. The player will receive two more cards from the Multi-Draw Bonus card at 104D and three more cards from the Multi-Draw Bonus card at 104E. In this illustration, the player has three of a kind for which he/she receives 15 credits. Twelve unique hands have been generated shown in Table III.

TABLE III

| | | | | |
|---|---|---|---|---|
| 2 of hearts | 2 of clubs | 2 of spades | 6 of hearts | 7 of diamonds |
| 2 of hearts | 2 of clubs | 2 of spades | 6 of hearts | 10 of hearts |
| 2 of hearts | 2 of clubs | 2 of spades | 6 of hearts | 2 of diamonds |
| 2 of hearts | 2 of clubs | 2 of spades | 6 of hearts | King of spades |
| 2 of hearts | 2 of clubs | 2 of spades | 10 of clubs | 7 of diamonds |
| 2 of hearts | 2 of clubs | 2 of spades | 10 of clubs | 10 of hearts |
| 2 of hearts | 2 of clubs | 2 of spades | 10 of clubs | 2 of diamonds |
| 2 of hearts | 2 of clubs | 2 of spades | 10 of clubs | King of spades |
| 2 of hearts | 2 of clubs | 2 of spades | king of hearts | 7 of diamonds |
| 2 of hearts | 2 of clubs | 2 of spades | king of hearts | 10 of hearts |
| 2 of hearts | 2 of clubs | 2 of spades | king of hearts | 2 of diamonds |
| 2 of hearts | 2 of clubs | 2 of spades | king of hearts | King of spades |

Figure 2D:
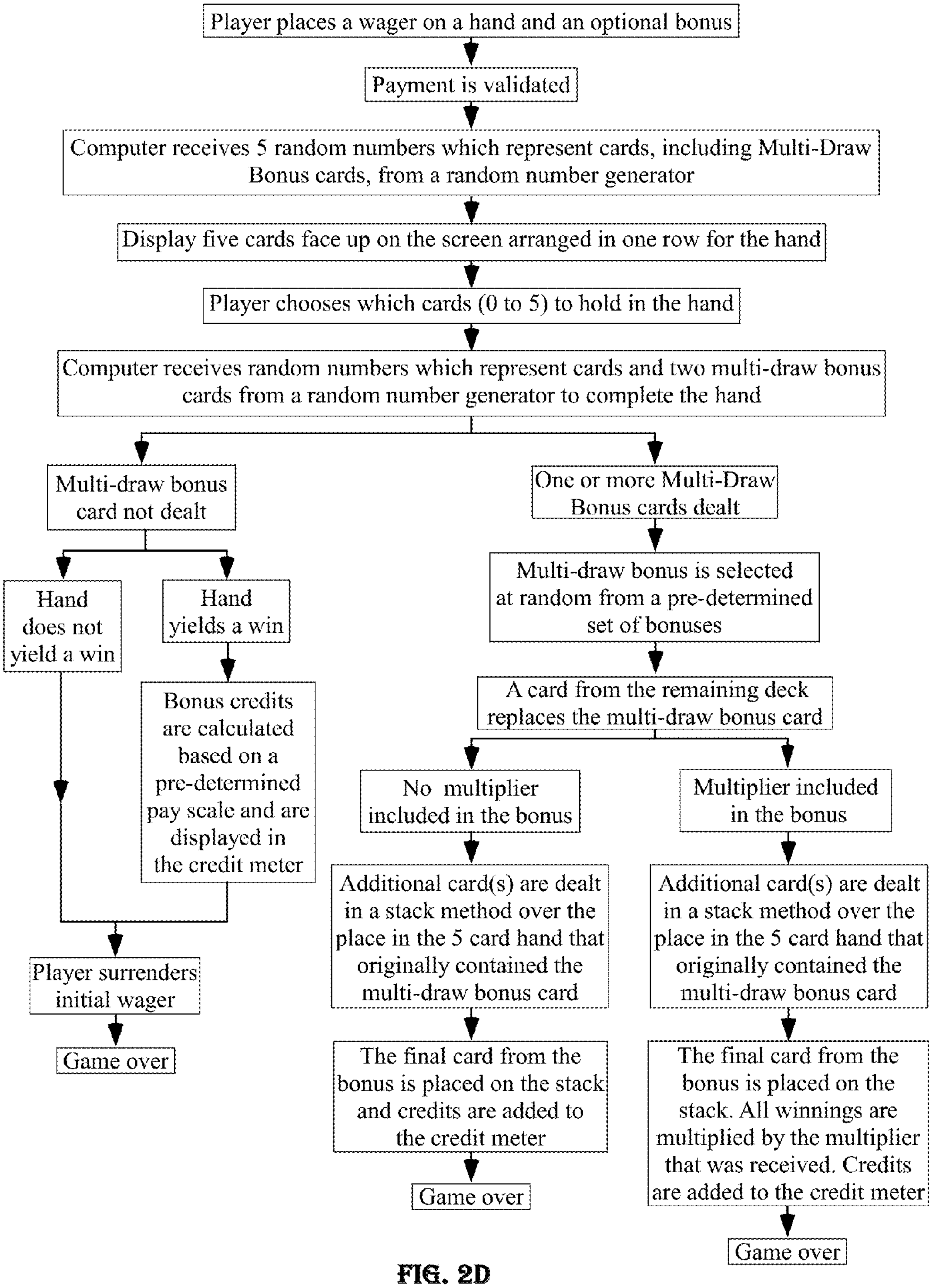
FIG. 2D illustrates a block diagram of one embodiment of typical game play.

FIG. 2D illustrates a block diagram of typical game play. The player places a wager on a hand and an optional bonus hand to initiate game play. The payment is validated by the computer.

The computer receives five random numbers that represent cards from a random number generator, including Multi-Draw Bonus cards, and displays the five cards from a standard deck of fifty-two cards on the screen, arranged in one row of five cards.

The player chooses which cards to hold (zero to five) in the hand and which will be discarded.

The computer receives random numbers that represent cards from the remaining deck plus n Multi-Draw Bonus cards from a random number generator, and displays the replacement cards in place of the discarded cards.

If a Multi-Draw Bonus card is not dealt, and the hand does not yield a win the player surrenders the initial wager and the game is over.

If a Multi-Draw Bonus card is not dealt and the hand yields a win, credits are calculated based on a pre-determined pay scale. The credits may be displayed in the credit meter.

If a Multi-Draw Bonus card is dealt, a Multi-Draw Bonus is selected by the computer at random from a pre-determined set of bonuses. A card from the remaining deck replaces the Multi-Draw Bonus card.

If the bonus selected by the computer does not include an additional multiplier, credits are based on a pre-determined pay scale and are displayed in the credit meter. Additional card(s) are dealt in a stack method over the place in the five card hand that originally contained the Multi-Draw Bonus card. The final card from the bonus is placed on the stack and credits are added to the credit meter.

If the bonus selected by the computer includes an additional multiplier, bonus credits are based on a pre-determined pay scale and multiplied by the bonus multiplier and are displayed in the credit meter. Additional card(s) are dealt in a stack method over the place in the five card hand that originally contained the Multi-Draw Bonus card. The final card from the bonus is placed on the stack. All winnings are multiplied by the multiplier that was received. Credits are added to the credit meter.

Figure 3A:
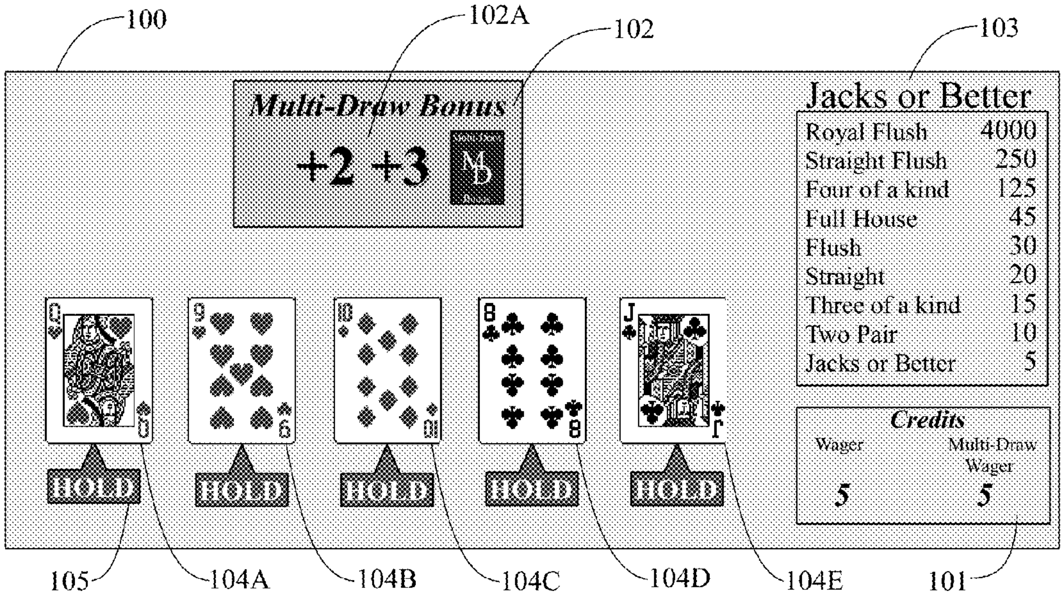
FIG. 3A illustrates another embodiment of game play showing that all cards are held from the deal.

FIG. 3A illustrates the opening 5 credit wager plus an additional 5 credit wager for a chance at being dealt one Multi-Draw Bonus card to be dealt on the deal of the hand. This embodiment allows the player to pay 5 credits for each Multi-Draw Bonus card to be dealt on the draw. In this embodiment, the Multi-Draw Bonus card will be drawn into held position 104D. In yet another embodiment, the player may pay for more than one Multi-Draw Bonus cards to be drawn into the hand. Illustrated wherein are the active gaming area 100 on which the Multi-Draw Bonus indicator 102, the pre-determined pay scale 103, the credit meter 101, and the dealt cards 104A, 104B, 104C, 104D, and 104E. Cards 104A, 104B, 104C, 104D, and 104E are held by the player, and are indicated as held by the hold indicator 105. In the illustration, the player decides to hold the queen of hearts 104A, nine of hearts 104B, ten of diamonds 104C, eight of clubs 104D, and jack of clubs 104E.

Figure 3B:
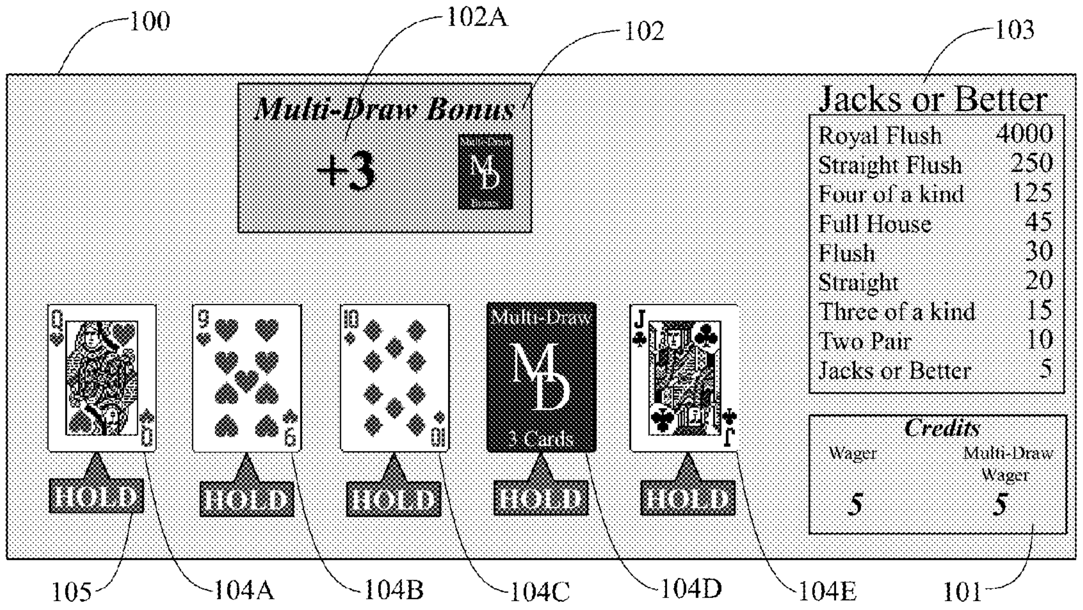
FIG. 3B illustrates one Multi-Draw Bonus card being placed into a hold position on the draw of the hand.

FIG. 3B illustrates one Multi-Draw Bonus card being drawn into the hand at position 104D. The CPU used the random number generator to determine that the Multi-Draw Bonus card will award the player with three additional cards at 104D. Illustrated wherein is a Multi-Draw Bonus cards 104D being enabled by an additional wager and the replacement of one held cards with it being a Multi-Draw Bonus card. Shown are the active gaming area 100 on which the Multi-Draw Bonus indicator 102 displaying the Multi-Draw Bonus 102A of +3 102A, the pre-determined pay scale 103, the credit meter 101, and the cards 104A, 104B, 104C, 104D, and 104E, are displayed. Cards 104A, 104B, 104C, 104D, and 104E held by the player are indicated as held by the hold indicator 105. In this illustration, the location 104D is randomly filled by the random card generator with one Multi-Draw Bonus card 104D.

Figure 3C:
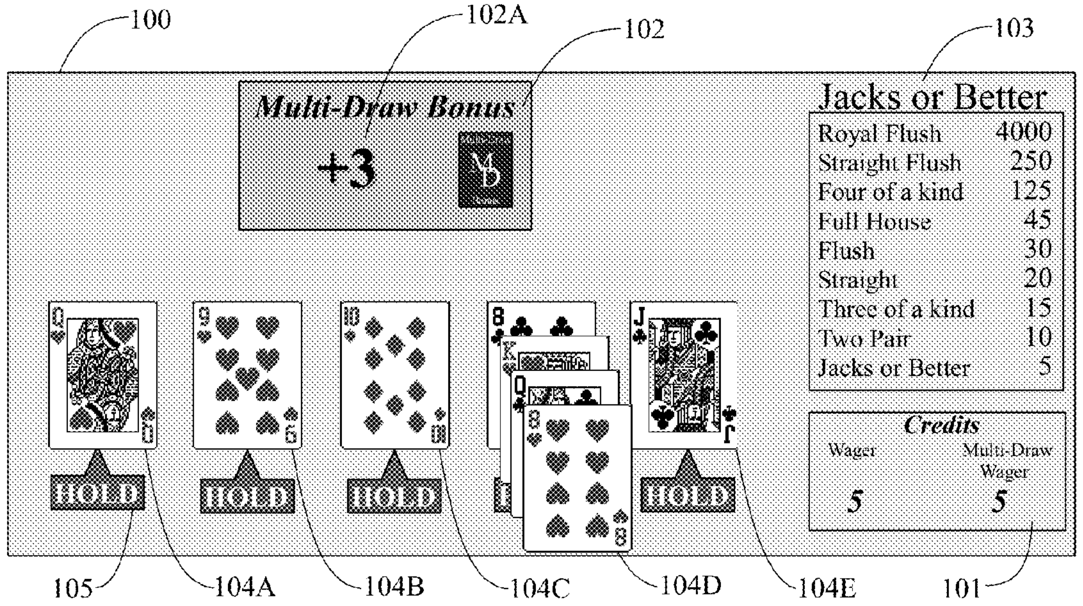
FIG. 3C illustrates the next draw of cards from the remaining deck to replace the Multi-Draw Bonus card from FIG. 3B.

FIG. 3C illustrates the end result of having been dealt one Multi-Draw Bonus cards into the hand and the additional cards from the deck to complete the hands. Four unique hands have been generated for the player to receive winnings based on the pre-determined pay scale 103. Shown are the active gaming area 100 on which the Multi-Draw Bonus indicator 102 showing and additional +3 cards 102A from the Multi-Draw Bonus card, the pre-determined pay scale 103, the credit meter 101, and the cards 104A, 104B, 104C, 104D, and 104E, are displayed. In this illustration, the Multi-Draw Bonus card 104D has been replaced by the held eight of clubs, new king of hearts, queen of clubs, and eight of hearts, 104D. The Multi-Draw Bonus card triggers the game to randomly select a bonus from a pre-determined set of bonuses and is indicated in the bonus indicator box 102. In this situation, a +3 bonus 102A is selected by the computer and the random number generator. The player will receive three more cards from the Multi-Draw Bonus card at 104D. Four unique hands have been generated shown in Table IV.

TABLE IV

| | | | | |
|---|---|---|---|---|
| Queen of hearts | 9 of hearts | 10 of diamonds | 8 of clubs | Jack of clubs |
| Queen of hearts | 9 of hearts | 10 of diamonds | King of hearts | Jack of clubs |

TABLE IV-continued

| | | | | |
|---|---|---|---|---|
| Queen of hearts | 9 of hearts | 10 of diamonds | Queen of clubs | Jack of clubs |
| Queen of hearts | 9 of hearts | 10 of diamonds | Eight of hearts | Jack of clubs |

Figure 3D:
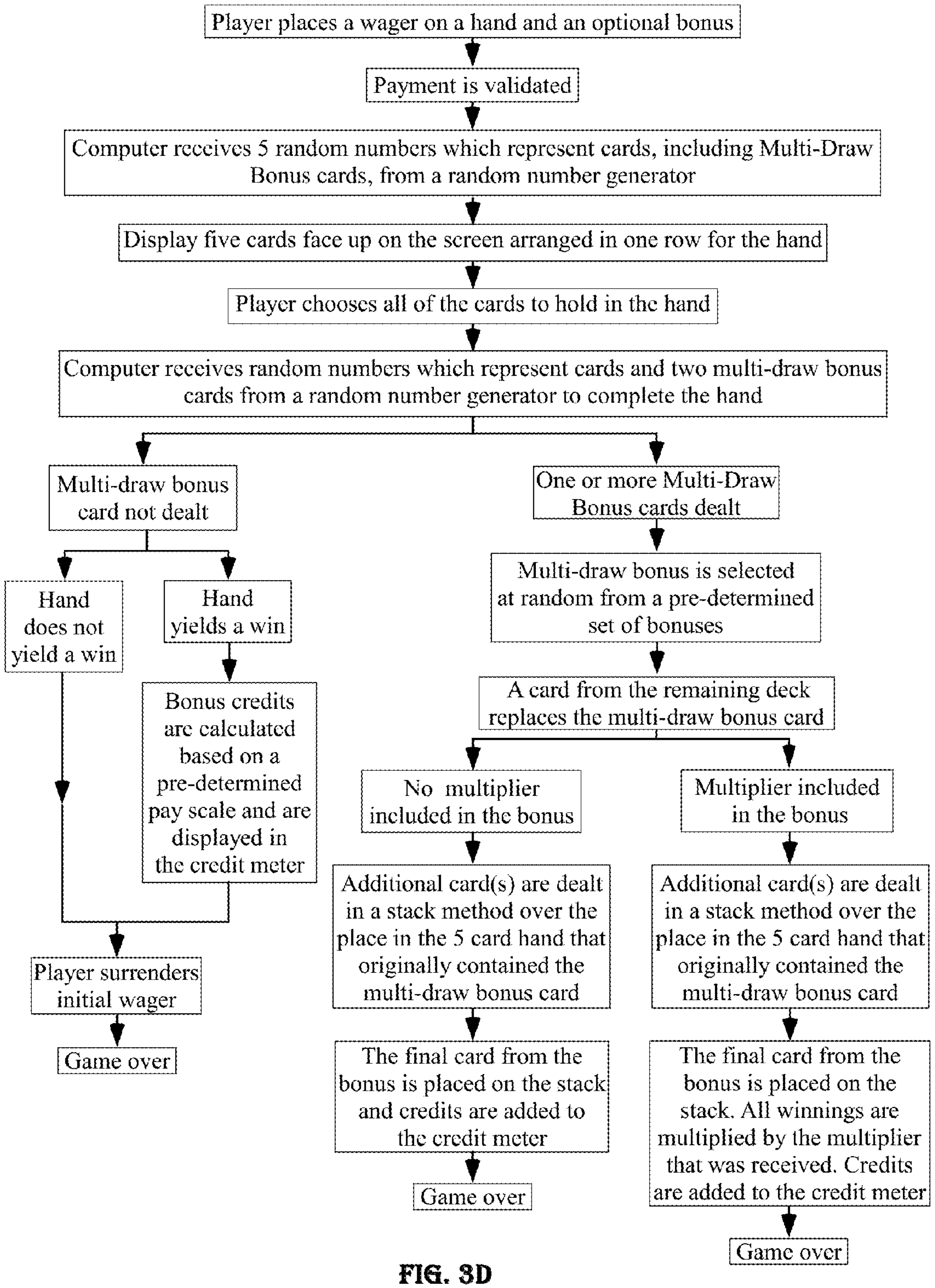
FIG. 3D illustrates a block diagram of one embodiment of typical game play.

FIG. 3D illustrates a block diagram of typical game play. The player places a wager on a hand and an optional bonus hand to initiate game play. The payment is validated by the computer.

The computer receives five random numbers that represent cards from a random number generator, including Multi-Draw Bonus cards, and displays the five cards from a standard deck of fifty-two cards on the screen, arranged in one row of five cards.

The player chooses to hold all five cards in the hand.

The computer receives random numbers that represent cards from the remaining deck plus n Multi-Draw Bonus cards from a random number generator, and displays the replacement cards in place of the discarded cards.

If a Multi-Draw Bonus card is not dealt, and the hand does not yield a win the player surrenders the initial wager and the game is over.

If a Multi-Draw Bonus card is not dealt and the hand yields a win, credits are calculated based on a pre-determined pay scale. The credits may be displayed in the credit meter.

If a Multi-Draw Bonus card is dealt, a Multi-Draw Bonus is selected by the computer at random from a pre-determined set of bonuses. A card from the remaining deck replaces the Multi-Draw Bonus card.

If the bonus selected by the computer does not include an additional multiplier, credits are based on a pre-determined pay scale and are displayed in the credit meter. Additional card(s) are dealt in a stack method over the place in the five card hand that originally contained the Multi-Draw Bonus card. The final card from the bonus is placed on the stack and credits are added to the credit meter.

If the bonus selected by the computer includes an additional multiplier, bonus credits are based on a pre-determined pay scale and multiplied by the bonus multiplier and are displayed in the credit meter. Additional card(s) are dealt in a stack method over the place in the five card hand that originally contained the Multi-Draw Bonus card. The final card from the bonus is placed on the stack. All winnings are multiplied by the multiplier that was received. Credits are added to the credit meter.

Figure 4A:
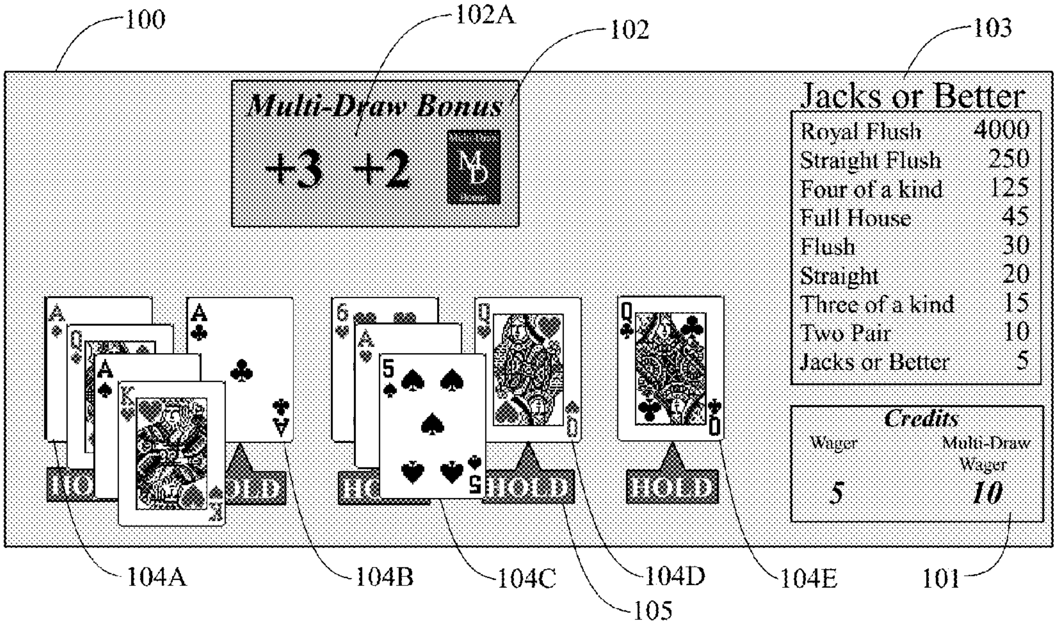
FIG. 4A illustrates the final hand after two Multi-Draw Bonus cards have been dealt into the hand, removed, replaced by the additional cards from the deck.

FIG. 4A illustrates the end result of having been dealt two Multi-Draw Bonus cards into the hand and the additional cards from the deck to complete the hands. Twelve unique hands have been generated for the player to receive winnings based on the pre-determined pay scale 103. Shown are the active gaming area 100 on which the Multi-Draw Bonus indicator 102 showing and additional +3 cards and +2 cards from the Multi-Draw Bonus cards, the pre-determined pay scale 103, the credit meter 101, and the cards 104A, 104B, 104C, 104D, and 104E, are displayed. In this illustration, a Multi-Draw Bonus card 104A has been replaced by the ace of diamonds, queen of diamonds, ace of spades, and king of hearts. The second Multi-Draw Bonus card 104C has been replaced by the six of hearts, ace of hearts, and 5 of spades. The Multi-Draw Bonus cards trigger the game to randomly select a bonus from a pre-determined set of bonuses and is indicated in the bonus indicator box 102. In this situation a +3+2 bonus 102A is selected by the computer and the random number generator. Twelve unique hands have been generated.

Figure 4B:
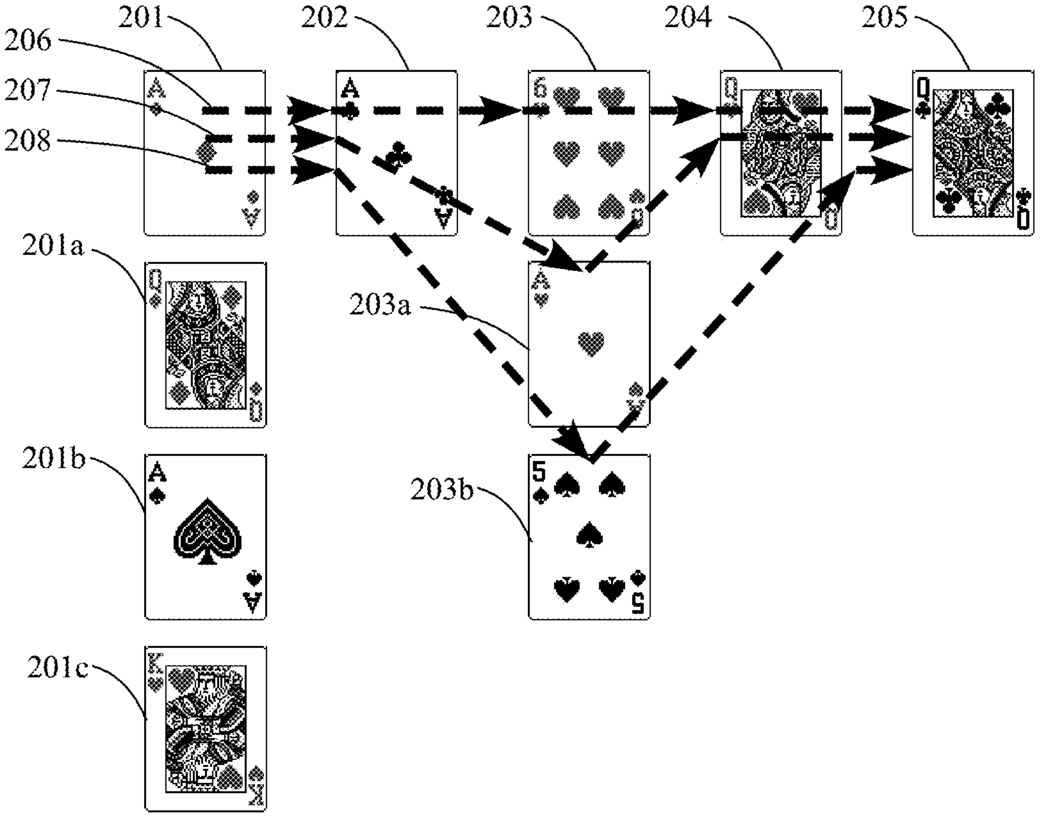
FIG. 4B illustrates the first three hands generated by the additional cards.

FIG. 4B illustrates the first group of three hands generated by the additional cards. The first hand, 206, comprises the ace of diamonds 201, ace of clubs 202, six of hearts 203, queen of hearts 204, and queen of clubs 205. The second hand 207, comprises the ace of diamonds 201, ace of clubs 202, ace of hearts 203*a*, queen of hearts 204, and queen of clubs 205. The third hand 208, comprises the ace of diamonds 201, ace of clubs 202, five of spades 203*b*, queen of hearts 204, and queen of clubs 205.

Figure 4C:
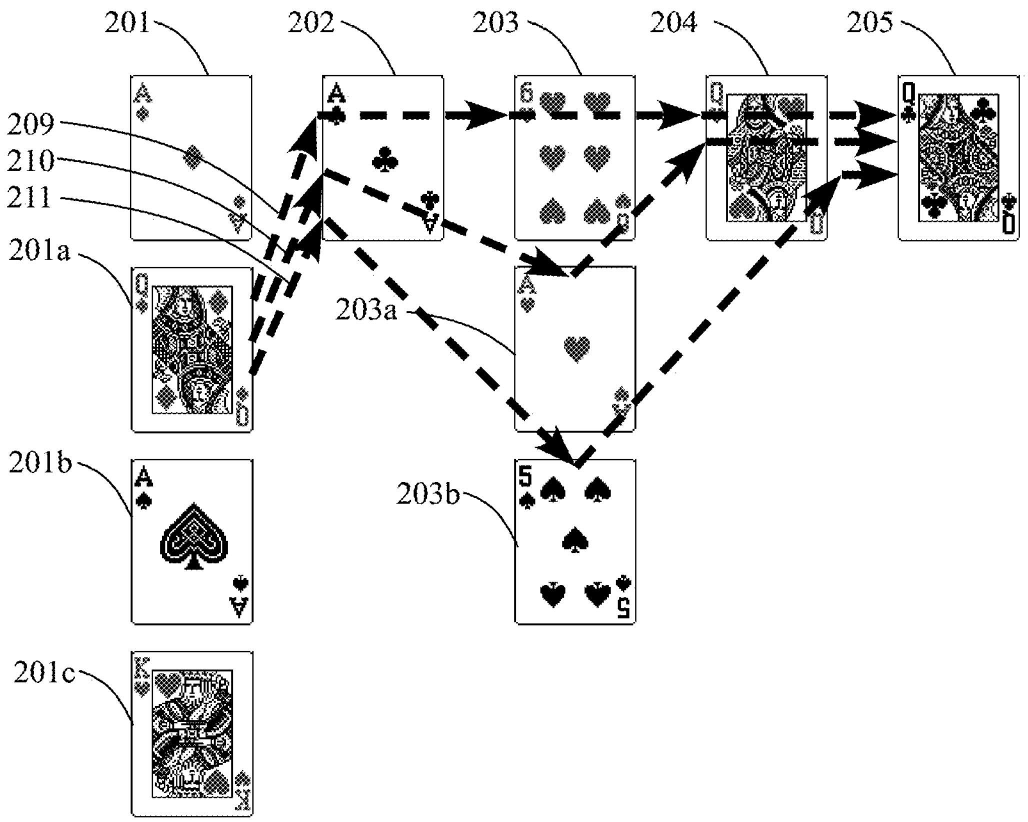
FIG. 4C illustrates the second three hands generated by the additional cards.

FIG. 4C illustrates the second group of three hands generated by the additional cards. The fourth hand, 209, comprises the queen of diamonds 201*a*, ace of clubs 202, six of hearts 203, queen of hearts 204, and queen of clubs 205. The fifth hand 210, comprises the queen of diamonds 201*a*, ace of clubs 202, ace of hearts 203*a*, queen of hearts 204, and queen of clubs 205. The sixth hand 211, comprises the queen of diamonds 201*a*, ace of clubs 202, five of spades 203*b*, queen of hearts 204, and queen of clubs 205.

Figure 4D:
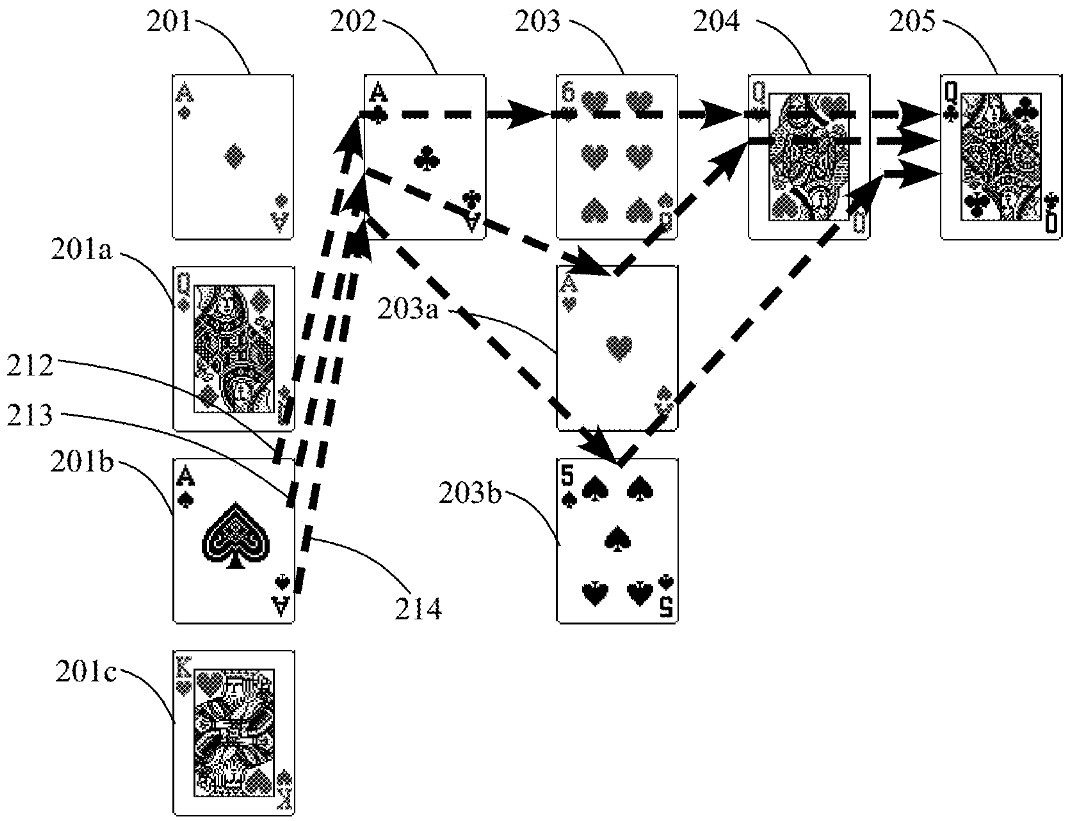
FIG. 4D illustrates the third three hands generated by the additional cards.

FIG. 4D illustrates the third group of three hands generated by the additional cards. The seventh hand, 212, comprises the ace of spades 201*b*, ace of clubs 202, six of hearts 203, queen of hearts 204, and queen of clubs 205. The eighth hand 213, comprises the ace of spades 201*b*, ace of clubs 202, ace of hearts 203*a*, queen of hearts 204, and queen of clubs 205. The ninth hand 213, comprises the ace of spades 201*b*, ace of clubs 202, five of spades 203*b*, queen of hearts 204, and queen of clubs 205.

Figure 4E:
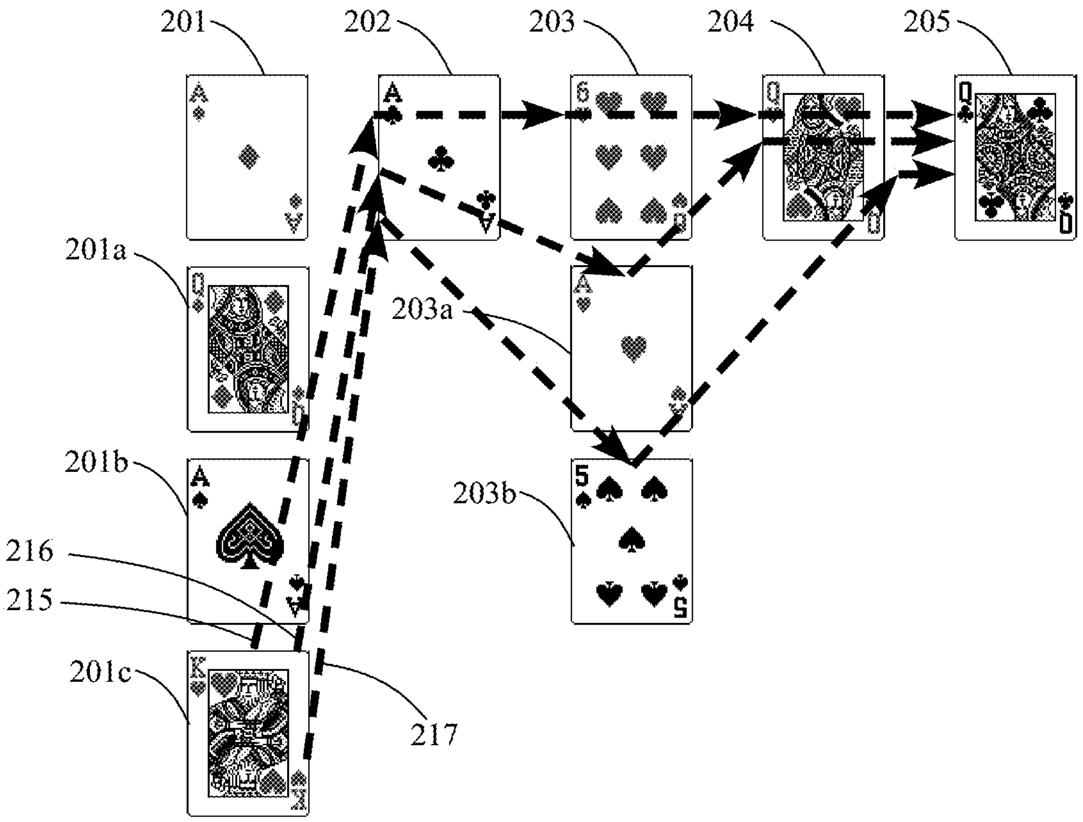
FIG. 4E illustrates the last three hands generated by the additional cards.

FIG. 4E illustrates the last group of three hands generated by the additional cards. The tenth hand, 212, comprises the king of hearts 201*c*, ace of clubs 202, six of hearts 203, queen of hearts 204, and queen of clubs 205. The eleventh hand 213, comprises the king of hearts 201*c*, ace of clubs 202, ace of hearts 203*a*, queen of hearts 204, and queen of clubs 205. The twelfth hand 213, comprises the king of hearts 201*c*, ace of clubs 202, five of spades 203*b*, queen of hearts 204, and queen of clubs 205.

Figure 5:
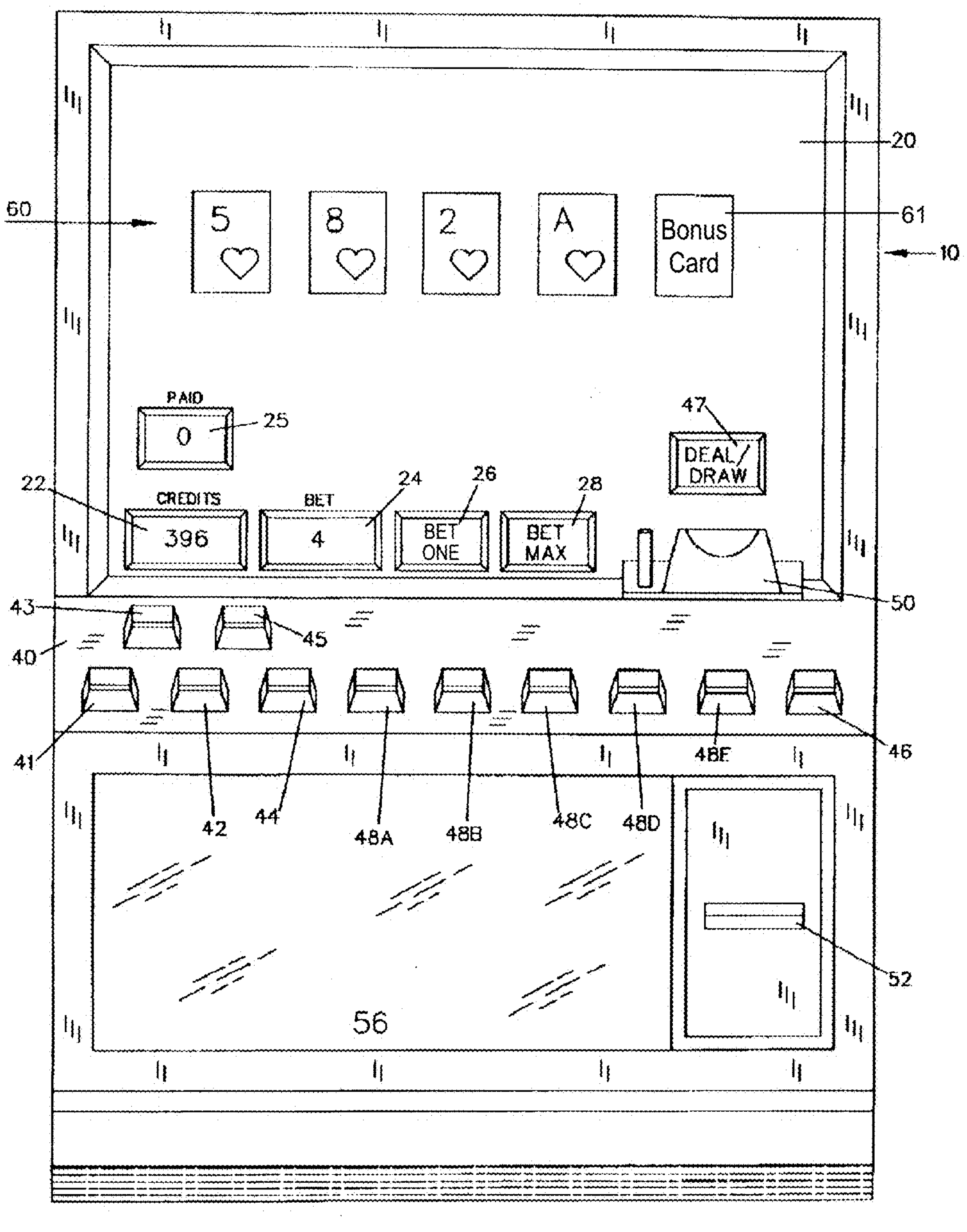
FIG. 5 illustrates a typical gaming console.

FIG. 5 shows a typical electronic video gaming machine 10 that is configured to provide to a player the method of the present invention. The electronic video gaming machine 10 includes a conventional coin acceptor 50 into which the player can insert coins or gaming tokens and a bill acceptor 52 mounted to the gaming machine 10 and into which the player can insert paper currency. The use of coins, tokens or paper currency is one mechanism by which a player may wager on the poker hands the player wishes to play. Also in the electronic video gaming machine 10, a credit meter display 22 is provided to show the amount of credits that the player has accrued on the gaming machine 10—either by inserting coins, tokens or paper currency or from winning plays achieved by the player. Whenever the player makes a wager, the amount of the wager is subtracted from the credit meter display 22. Whenever the player achieves a winning play during the play of the game, the amount of the winning play is added to the credit meter display 22.

A conventional payout hopper is also located on the interior of the gaming machine and is used to dispense coins or tokens to the player into a payout tray 56 when the player wishes to collect any winning amounts the player has accrued. Other suitable and conventional payout mechanisms can be used, such as a ticket printer or other cashless payout devices.

The gaming machine 10 also includes a video screen display 20 of any suitable size or type upon which representations of playing cards are displayed. In one embodiment, one or more hands can be displayed on the video screen display 20 at the same time. As illustrated in FIG. 3, a first hand is shown at location 60. Each hand would preferably have five card locations preferably from left to right in a horizontal row, although other manners of displaying multiple hands including stacks of cards can be used. The video screen display 20 also contains a location at which the amount wagered on each hand is shown, for example, "Bet" 24. In this illustration, the player has bet 4 credits.

A button panel 40 is also provided on the gaming machine 10 with buttons mounted on the button panel 40 to be used by the player to control the operation of the gaming machine 10. Any suitable number or configuration of the buttons on the button panel can be used and, alternatively, conventional touch screen technology can be used for any or all of the buttons mounted on the button panel.

A typical button arrangement is shown on the button panel 40 in FIG. 3. A "BET ONE" button 42 is provided to allow the player to wager one credit at a time. A "BET MAX" button 44 is provided to allow the player to wager the maximum amount of credits permitted by the configuration of the gaming machine 10. Any number of credits can be set as the minimum or maximum amount that it is possible to wager on each hand. Typically, five credits may be the maximum number of credits for any particular hand. Alternatively, a BET ONE location 26 and a BET MAX location 28 can be provided on the video screen 20 to allow the player to wager by using conventional touch screen technology.

A conventional "DEAL/DRAW" button 46 is also provided on the button panel 40 which is used by the player to activate the initial deal of the cards at the deal stage of the method of play or the dealing of replacement cards at the draw stage of the method of play as is appropriate. Similarly, a DEAL/DRAW location 47 can be provided on the video screen 20 to allow the player to select either the deal step or the draw step by using conventional touch screen technology.

The button panel 40 is also provided with five "CARD" buttons 48A, 48B, 48C, 48D and 48E associated with each horizontal card location on the video screen display: card button 48A is associated with the left most card location, card button 48B is associated with the second from the left card location, card button 48C is associated with the middle card location, card button 48D is associated with the second from the right card location and card button 48E is associated with the right most card location. Each card button is preferably aligned below the card locations so that the player can easily associate the appropriate card button with the appropriate card location. The method of play of the various versions of the present invention will now be described. After the player has inserted an appropriate amount of coins, tokens or paper currency to add a sufficient amount of credits on the credit display meter 22, the player makes his initial wager. The player may press the BET ONE button 42 one or more times to bet in single increments or the player may merely press the "BET MAX" button 44 and the maximum number of credits are applied, for example, five credits would be wagered. The player can also use the touch screen locations to make his wager as described above.

To play the poker game, the player establishes a pool of credits, sets the wager, deals the cards, chooses which cards to hold and discard, draws replacement cards, and collects credits for winning card combinations, with enhancements for any bonus card 61 dealt and/or drawn.

Buttons

In one embodiment, a set of buttons are mounted on the button panel 40 and are used by the player to control the functions of the poker game: Bet One 42, Bet Max 44, Deal/Draw 46, Help 43, Pay Table 45, and Cash Out 41. Any or all of these control buttons may be displayed on the video display 20 and/or buttons electronically connected to the gaming device. If necessary, any number of buttons may be added to further facilitate control of the game, such as Hold buttons to "hold" the cards shown on the video display displayed.

Meters

In one embodiment, meters are shown on the video display screen to display the salient information for the game: Credits meter 22, Bet meter 24, and Paid meter 25. The Credits meter 22 displays the total number credits remaining in the credit pool; the Bet meter 24 displays the amount wagered on the current, previous, and/or upcoming poker hand and is associated with the Bet One 42 and Bet Max 44 buttons; and the Paid meter 25 displays the amount of credits won on the current or previous poker hand.

Credit Pool

In one embodiment, the player deposits coins, tokens, paper currency, credit cards, debit cards, or other forms of physical and/or electronic currency into the coin acceptor slot 50 or a paper currency bill acceptor 52 to establish a pool of credits. The amount of this common pool of credits is displayed to the player on the credit meter 22. The pool of credits increases and decreases according to the player's wins or losses and may be supplemented, if necessary, by the player by additional deposits of coins, tokens, paper currency, credit cards, debit cards, or other forms of physical and/or electronic currency.

Set the Wager

In one embodiment, the player sets the value of the wager by using the Bet One 42 and Bet Max 44 buttons. The bet may range between one credit and N-credits, with N equal to a predetermined maximum or set by the current value of the Credit Pool. The typical video poker gaming machine uses a five credit maximum wager.

Deck of Cards

In one embodiment, each card dealt is selected from one or more suitable decks of cards such as one or more fifty-two card traditional decks (i.e. the traditional four suits of Spades, Hearts, Diamonds, Clubs, with thirteen ranks in each suit of 2, 3, 4, 5, 6, 7, 8, 9, 10, Jack, Queen, King and Ace) plus bonus cards added before or after the deal or the draw.

Deal of Cards

In one embodiment, the player causes the machine 10 to deal the cards by pressing the Deal button 46. Once the Deal button 46 is pressed, the wager is final and non-refundable. For each deal, the machine 10 randomly displays five cards face-up in the five card positions. In a single standard deck embodiment, a displayed card is removed from the deck and may not be dealt again during that game. Typically, only the remaining non-dealt cards in the deck are used to replace a dealt card.

Hold and Discard

In one embodiment, the player selects which cards to hold and which cards to discard using the buttons on the machine 10 or touching the cards on the video display 20 (i.e. pressing a button or touching a card will "hold" the card) Alternatively, the machine 10 may automatically select cards to hold and/or discard and then allow the player to override the selections by using the buttons or touching the display screen 20. This may be useful in a training mode.

Winning Card Combinations

In one embodiment, the player is paid for predetermined winning combinations of cards that appear in the final hand. Each winning combination pays the amount indicated on a pre-determined pay scale times the total amount wagered on that hand. Furthermore, the value of a winning card combination may be enhanced by the appearance of one or more Multi-Draw Bonus cards during the deal or draw; all enhanced values are also reflected on the pre-determined pay scale.

SUMMARY

The foregoing description of various embodiments of the invention has been presented for purposes of illustration and description. It is not intended to be exhaustive or to limit the invention to the precise forms disclosed. Obvious modifications or variations are possible in light of the above teachings. The embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims to be interpreted in accordance with the breadth to which they are fairly, legally, and equitably entitled.

The invention claimed is:

1. A method for playing video poker comprising a computer, random number generator, and a video display screen wherein the computer receives random numbers from the random number generator, representing cards to be dealt and wherein the computer displays the dealt cards on the video display screen, and wherein a primary poker hand is established by the computer dealing a first hand of cards from a deck of cards, containing at least one Multi-Draw Bonus Card providing for n additional cards to be dealt from the same deck of cards in the position of the Multi-Draw Bonus Card, discarding selected cards and replacing the discarded cards to form a final hand and wherein a payout is determined by the computer for the final hand based on a pre-determined pay scale, wherein the first dealt hand includes at least one Multi-Draw Bonus card on the deal, said Multi-Draw Bonus card, providing for n additional cards to be dealt by the computer from the same deck of cards in the position of the Multi-Draw Bonus card such that n final hands are formed with each additional n card in addition to the first hand, said n additional cards being dealt as a stack of cards in the Multi-Draw Bonus position, a payout if any being determined for the final first hand and for each of the additional n final hands.

2. The video poker method of claim 1 wherein the Multi-Draw Bonus card includes a multiplier number for multiplying the total final payout of any winning hand.

3. The video poker method of claim 2 wherein the Multi-Draw Bonus card includes a multiplier and additional hands to be dealt.

4. The video poker method of claim 1 wherein two Multi-Draw Bonus cards are dealt.

5. A method for playing video poker comprising a computer, random number generator, and a video display screen wherein the computer receives random numbers from the random number generator, representing cards to be dealt and wherein the computer displays the dealt cards on the video display screen, wherein a first standard five card hand is dealt containing at least one Multi-Draw Bonus Card providing for n additional cards to be dealt from the same deck of cards in the position of the Multi-Draw Bonus Card, and selected cards are discarded and replacement cards are draws to replace the discarded cards, wherein the first dealt band includes one or more Multi-Draw Bonus cards on the deal, each Multi-Draw Bonus card providing n additional cards to form a total of n hands, with a payout if any being determined by the computer for each of the n bands, said n additional cards being dealt from the same deck of cards as a stack of cards in the Multi-Draw Bonus position.

6. The video poker method of claim 5 wherein the Multi-Draw Bonus card includes a multiplier number for multiplying the total final payout of any winning hand.

7. The video poker method of claim 6 wherein the Multi-Draw Bonus card includes a multiplier and additional hands to be dealt.

8. The video poker method of claim 5 wherein two Multi-Draw Bonus cards are dealt.

9. A method for playing video poker comprising a computer, random number generator, and a video display screen wherein the computer receives random numbers from the random number generator, representing cards to be dealt and wherein the computer displays the dealt cards on the video display screen, wherein a primary poker hand is established by dealing a first hand of cards containing at least one Multi-Draw Bonus Card providing for n additional cards to be dealt from the same deck of cards in the position of the Multi-Draw Bonus Card, discarding selected cards and replacing the discarded cards to form a final hand and wherein a payout is determined for the final hand based on a pre-determined pay scale, the cards in the first hand including at least one bonus card on the deal which provides for n additional cards to be dealt in the position of the bonus card such that n additional final hands are formed, a payout if any being determined by the computer for the first final hand and for each of the additional n final hands, said n additional cards being dealt from the same deck or cards as a stack of cards in the bonus position.

10. The video poker method of claim 9 wherein the Multi-Draw Bonus Card includes a multiplier number for multiplying the total final payout of any winning hand.

11. The video poker method of claim 10 wherein the Multi-Draw Bonus Card includes at multiplier and additional hands to be dealt.

12. The video poker method of claim 9 wherein two Multi-Draw Bonus Cards are dealt.

13. A method for playing video poker comprising a computer, a random number generator, and a video display screen, wherein primary poker hand is established by dealing a final hand of cards containing at least one Multi-Draw Bonus Card providing for n additional cards to be dealt front the same deck cards in the position of the Multi-Draw Bonus Card, discarding selected cards and replacing the discarded cards to form a final hand, a payout being determined by the computer for the final hand based on a pre-determined pay scale, wherein the primary poker hand includes a bonus card on the deal that provides for n additional cards to be dealt in the position of the bonus card such that n final hands are formed, with a payout, if any, being determined by the computer for each of the n final hands including the first final hand, said n additional cards being dealt from the same deck of cards as a stack of cards in the Multi-Draw Bonus position.

14. The video poker method of claim 13 wherein the Multi-Draw Bonus Card includes a multiplier number for multiplying the total final payout of any winning hand.

15. The video poker method of claim 14 wherein the Multi-Draw Bonus Card includes a multiplier and additional hands to be dealt.

16. The video poker method of claim 13 wherein two Multi-Draw Bonus Cards are dealt.

* * * * *